United States Patent [19]

Mahany et al.

[11] Patent Number: 5,070,536

[45] Date of Patent: Dec. 3, 1991

[54] MOBILE RADIO DATA COMMUNICATION SYSTEM AND METHOD

[75] Inventors: Ronald L. Mahany; Marvin L. Sojka; Guy J. West, all of Cedar Rapids, Iowa

[73] Assignee: Norand Corporation, Cedar Rapids, Iowa

[21] Appl. No.: 389,727

[22] Filed: Aug. 4, 1989

Related U.S. Application Data

[63] Continuation-in-part of Ser. No. 228,355, Aug. 4, 1988, Pat. No. 4,910,794.

[51] Int. Cl.$^5$ .......................................... H04B 17/00
[52] U.S. Cl. .......................................... 455/67; 370/84
[58] Field of Search ............... 455/56, 67, 68, 226, 455/73, 88, 89, 38; 370/84, 90, 85.7, 85.8, 95.1, 95.2; 340/825.44, 825.5

[56] References Cited

U.S. PATENT DOCUMENTS

| | | | |
|---|---|---|---|
| 4,642,632 | 2/1987 | Ohyagi et al. | 455/38 |
| 4,763,322 | 8/1988 | Eizenhofer | 370/84 |
| 4,789,983 | 12/1988 | Acampora et al. | 370/84 |
| 4,803,726 | 2/1989 | Levine et al. | 370/84 |
| 4,816,820 | 3/1989 | Davis | 370/84 |
| 4,910,794 | 3/1990 | Mahany | 455/67 |

Primary Examiner—Curtis Kuntz
Attorney, Agent, or Firm—Neuman, Williams, Anderson & Olson

[57] ABSTRACT

In an exemplary embodiment, a test signal is sent by a base station at a suitable point in a communications protocol. According to the evaluation of the test signal transmission, a relatively high data rate or a lower more conservative data rate is selected by a mobile unit for the transmission of a relatively lengthy data message. The test signal can be associated with a query from a mobile unit having a message to send, or with a contention polling message from the base. Such test signal can be transmitted at the lower data rate where its transmission characteristics (e.g. signal strength, jitter or quality of transmission of known information) can be used to predict probable feasibility of transmission at the higher data rate, but most preferably the test signal is part of a high data rate contention poll which may alternate with a low data rate contention poll.

49 Claims, 7 Drawing Sheets

SYSTEM TIMING (msec)

SYSTEM TIMING (msec)

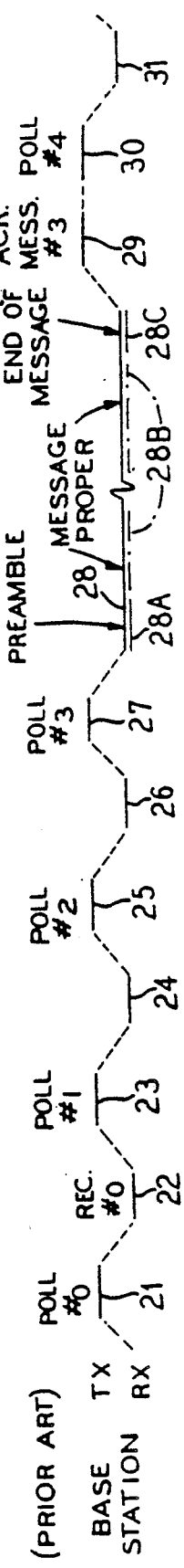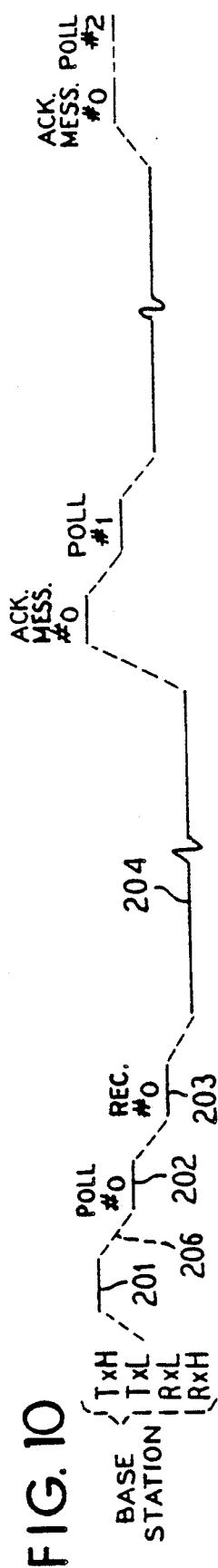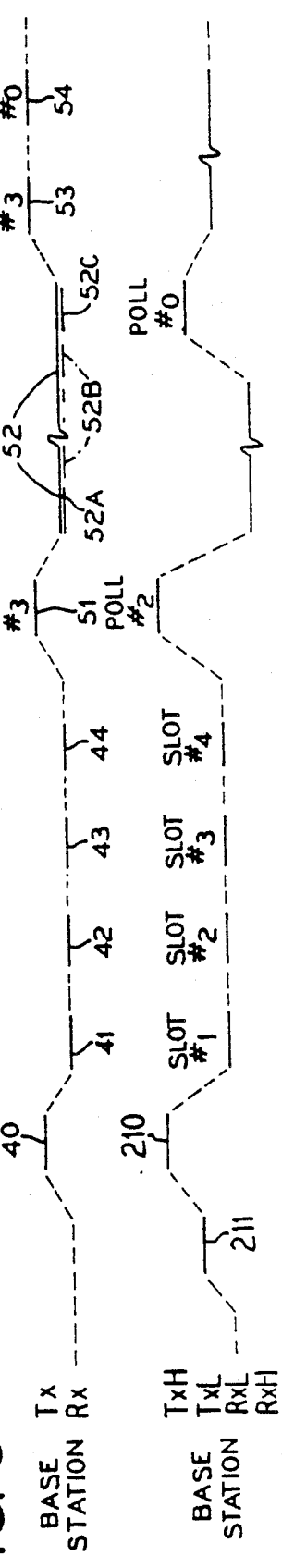

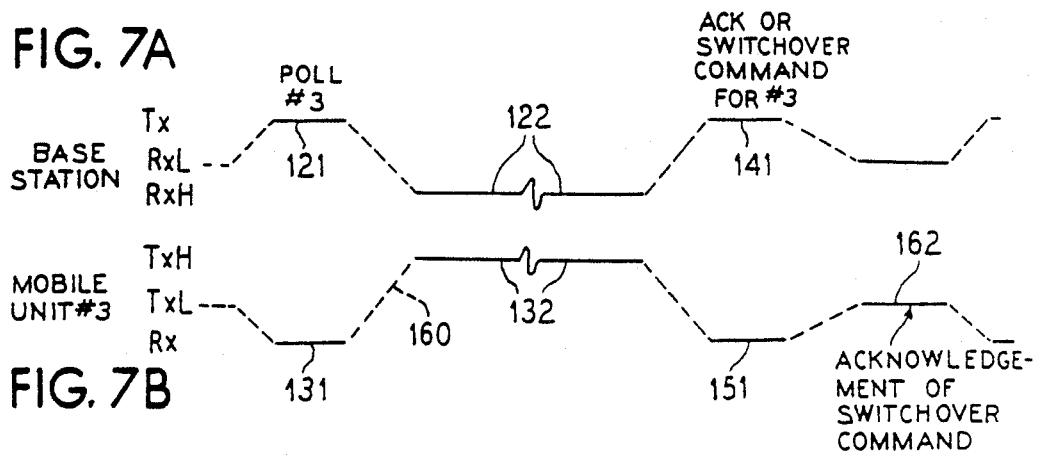
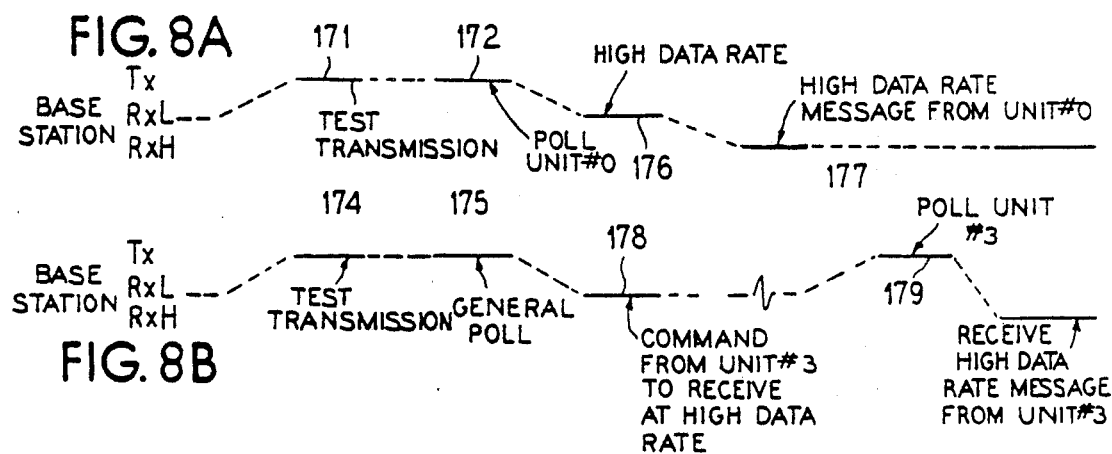
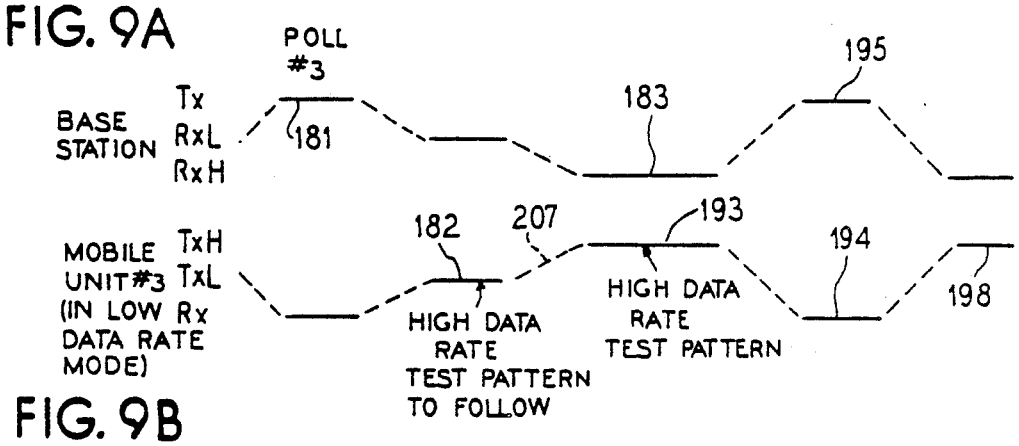

MOBILE RADIO DATA COMMUNICATION SYSTEM AND METHOD

CROSS-REFERENCE TO RELATED APPLICATION

The present application is a continuation in part of a pending application of Ronald L. Mahany U.S. Ser. No. 07/228,355 filed Aug. 4, 1988 now U.S. Pat. No. 4,910,794 issued Mar. 20, 1990, and the entire disclosure of this pending application including the drawings is hereby incorporated herein by reference.

Reference is made pursuant to 35 USC 120 to the following earlier patent applications: Marvin L. Sojka application U.S. Ser. No. 07/265,842 filed Nov. 1, 1988, now U.S. Pat. No. 4,940,974 issued July 10, 1990; and marvin L. Sojka application U.S. Ser. No. 07/292,810 filed Jan. 3, 1989, now U.S. Pat. No. 4,924,462 issued May 8, 1990; and each of these earlier patent applications is hereby incorporated herein by reference in its entirety including Appendices and drawings.

BACKGROUND OF THE INVENTION

The present invention relates to improvements in radio data communication systems wherein a number of mobile transceiver units are to transmit data to a base station under a wide range of operating conditions. The invention is preferably to be applicable as an upgrade of an existing data capture system wherein a number of hand held transceiver units of an earlier design are already in the field representing a substantial economic investment in comparison to the cost of a base station.

In the design of low-cost narrowband FM receivers, superheterodyne configurations using one or more fixed intermediate frequencies (IF) are generally employed. Receiver selectivity is provided using crystal or ceramic filters at these IF's. The passband characteristics of these filters must be wide enough to accommodate the bandwidth occupied by the intended received signal, plus any expected center frequency error due to frequency offsets in the transmitted signal or receiver local oscillators which may arise from changes in ambient temperature or misalignment. The stopband performance of the IF filters is chosen to provide the maximum out-of-band attenuation that is compatible with target design specifications, passband requirements, and equipment cost goals.

The technical requirements for narrowband FM equipment were originally devised for analog transmission of voice messages. Because the frequency spectrum of voice was easily quantifiable, it was possible to band-limit the voice signal at baseband with no loss of information content, and utilize an optimal transmission bandwidth for acceptable signal quality at the receiver. Channel spacings were then derived based upon this optimal bandwidth, and the stability of the transmitter and receiver oscillator frequencies that could economically be achieved in portable and mobile equipment.

In UHF land-mobile equipment meeting the required transmit and receiver oscillator stabilities, the worst case frequency error is often comparable to the bandwidth of a transmitted voice signal. In order to accommodate some fraction of the worst case frequency error, it has been a common practice to substantially broaden the IF filter passband-widths.

The transmission of binary data through modified narrowband, FM, voice quality equipment requires special considerations. Unlike voice transmission, band-limiting the signal limits the information transmission capabilities of the system. In order to obtain maximum information throughput, it is desirable to utilize the available bandwidth as fully as possible. However, for equipment to operate over a wide temperature range, transmitted bandwidth, and therefore data rate, must be constrained to keep the received signal within the IF filter bandwidth(s) when large frequency offsets due to oscillator temperature instabilities are present.

Unfortunately, when equipment is designed to tolerate large frequency offsets, a lower data rate must be selected than that allowed by the IF filter bandwidths under less stringent conditions where oscillator frequencies are near their ideal values.

Another consideration in data rate selection is system range. This is most problematic in data communications systems employing mobile or portable remote devices. These devices may operate at close range, where received signals are strong, or in fringe areas where received signals are extremely weak. Selecting a relatively high data rate will result in higher data throughput under strong signal conditions, while under fringe conditions, operation at lower data rates, with optimized baseband filtering, can be substantially more reliable.

SUMMARY OF THE INVENTION

The primary object of the invention is improving the data throughput of low-cost FM or FSK data communications equipment used on existing narrowband channels, while still maintaining reliable performance in fringe reception areas, and under extreme conditions of temperature. This object is achieved by providing such low cost data communications equipment with the capability of automatically switching between two or more data rates, and by the provision of control means for adaptively selecting the best data rate dynamically according to changing operating conditions. In a preferred embodiment, this is accomplished using only baseband signal processing techniques. For communications systems which use some form of handshaking to establish a communications link between a base station and one of several remote portable or mobile units, a test signal may be incorporated into the handshaking protocol to evaluate relevant operating conditions. For example, a polling signal sent from a base station may itself constitute a test signal which is evaluated by one or more remote units having messages to transmit. A remote unit responding to the polling signal, may transmit as its response a selection signal specifying the data rate which has been determined to be optimum as a result of test signal evaluation.

Another object of the invention to provide a radio data communication system capable of increased throughput while retaining basic compatibility with an existing installed product family of mobile transceiver units.

In a preferred example, an existing system utilizing hand held RF terminals of fixed data rate is upgraded by means of system components capable of adaptively switching to a higher data rate. For example, in an existing system where a sequential polling of the hand held RF units is employed, the base station may insert a test pattern of substantially higher data rate into the polling process, such that upgraded transceiver units can determine the feasibility of use of such higher data rate, while earlier versions continue to operate at the fixed data rate. In a more advanced system, where RF terminals respond in random time slots to a general polling transmission, a test pattern at a substantially higher data rate may be appended to such general poll. Again, a prior RF terminal model of fixed data rate may operate as usual, while upgraded RF terminals may selectively respond with higher data rate messages. Further, the upgraded terminals are preferably of sufficiently low cost that they could be employed with existing base stations operating at a fixed data rate until such time as it became economically feasible to replace the base station.

Accordingly, a specific object of the invention resides in the provision of a low cost hand held data capture RF terminal capable of utilization with base stations having fixed data rate and also with an upgraded base station capable of cooperating with such terminal to provide substantially increased throughput.

Another specific object of the invention is to provide an improved base station compatible with an installed product family of fixed data rate RF terminals but capable of cooperating with upgraded RF terminals to achieve an optimized data rate during successive polling operations.

Further objects reside in the provision of a radio data communication system which provides a reliable and efficient communications link under a wide range of operating conditions.

Other objects, features and advantages of the present invention will be apparent from the following detailed description taken in connection with the accompanying drawings, and from the respective features of the appended claims taken individually and in cooperative combinations.

DESCRIPTION OF THE DRAWINGS

FIG. 2 is a diagrammatic illustration of the sequential polling procedure which is utilized with the prior art system of FIG. 1;

FIG. 5 is a diagram similar to FIG. 2 but illustrating a second protocol which is utilized in a recently introduced product family having, a high performance type of mobile terminal unit representing the next generation in comparison to the system represented in FIG. 4;

FIGS. 7A and 7B illustrate an implementation of the embodiment of FIG. 6 where the receiver of each mobile unit may operate only at a standard data rate, FIGS. 7A and 7B being shown to the same time scale, and utilizing respective levels to represent transmission and reception at a standard rate compatible with the earlier versions of the system and at a higher data rate for increased system throughput, FIG. 7A representing successive switching modes at the base station, and FIGS. 7B illustrating the corresponding switching modes of an exemplary mobile unit in radio communication with the base station;

FIGS. 8A and 8B are plots similar to that of FIG. 7A, but illustrating an embodiment in accordance with FIG. 6 wherein the base station transmits temperature information to all of the mobile units simultaneously, FIG. 8A relating to a sequential polling protocol and FIG. 8B illustrating an example with a contention type protocol;

FIGS. 9A and 9B show diagrams similar to those of FIGS. 7A and 7B, for illustrating an embodiment in accordance with FIG. 6 wherein each mobile unit may transmit a high data rate test pattern to the base station;

FIG. 10 is a plot similar to that of FIG. 2, but illustrating operation of the system of FIG. 6 wherein the base station sends a high data rate test pattern to all of the mobile units simultaneously, for example in advance of a sequential polling cycle;

FIG. 11 is a plot similar to that of FIG. 5, but showing the base station of FIG. 6 transmitting a high data rate test pattern for example immediately following a standard data rate general poll for the example of a contention type polling protocol.

FIG. 14 showing the specific example of N equals four and M equals one; FIG. 15 showing alternating high data rate and low data rate communications frames where N and M may both vary (generally in opposite senses) in successive cycles; and FIG. 16 showing a case where plural communications frames of one type (e.g. 9600 baud) occur between a lesser number (e.g. one) of the other type of communications frame, this pattern being repeated, or varied as a function of loading at the respective data rates.

DETAILED DESCRIPTION

Description of FIGS. 1-4

Figure 1:
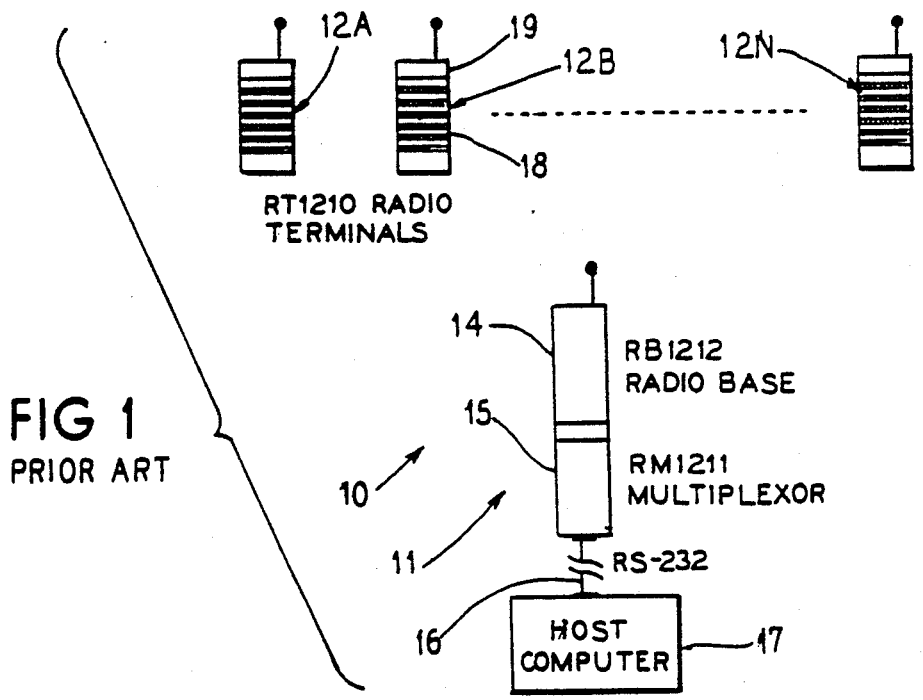
FIG. 1 is a diagrammatic illustration of an existing prior art radio data system which may be upgraded to incorporate features of the present invention.

FIG. 1 shows an existing radio frequency data transmission system 10 wherein a base station transceiver means 11 has a number of mobile transceiver units such as 12A, 12B, . . . , 12N in radio communication therewith.

By way of example, the base station may be comprised of a radio base unit 14 such as the model RB1212 of Norand Corporation, Cedar Rapids, Iowa which forms part of a product family known as the RT1200 system. In this case, the radio base 14 may receive data from the respective mobile RF terminals, e.g. of type RT1210, and transmit the received data via a multiplexor 15, e.g. type RM1211, and a communications link 16 (e.g. utilizing an RS-232 format) to a host computer 17.

The data capture terminals 12A, 12B, . . . , 12N may each be provided with a keyboard such as 18, a display as at 19, and a bar code scanning capability, e.g. via an instant bar code reader such as shown in U.S. Pat. No.

4,570,057 issued Feb. 11, 1986, and known commercially as the 20/20 instant bar code reader of Norand Corporation.

The RT1200 system utilizes time division multiplexing on a single frequency channel (e.g. in the 450 megahertz band) to provide access to the respective terminals. The RT1200 communications protocol is based on a sequential polling method that transmits a query addressed to each portable terminal in succession, and allows a specified amount of time for the addressed terminal to respond in case a data message is ready for transmission.

A transmitted message consists of an initialization sequence, unit address, message identifier and system information, message data and/or control commands, error control, and end of message indication. The basic sequential polling procedure of a base station such as the RB1212 is illustrated in FIG. 2 wherein level TX represents transmit mode of the base station, and level RX represents receive mode. In FIG. 2, solid line 21 represents a transmit time interval wherein the base station transmits a polling signal for a mobile unit of a first address, e.g. #0, at a predetermined data rate e.g. 4800 baud. The base station then allows a specified amount of time represented as time interval 22 for the addressed terminal to respond if communication activity is required. The intervals at 23 and 24 apply to a second terminal address, e.g. #1, the intervals 25 and 26 apply to a third terminal address, e.g. #2, the time intervals 27 and 28 represent the operation of a fourth terminal, e.g. #3, and so on.

The sequential polling process is timed by the multiplexor 15, FIG. 1, of the RT1200 system such that if a response is not received from the addressed mobile terminal within the allotted time such as indicated at 22, a poll is issued to the next terminal in the sequence, e.g. as indicated at 23. In the RT1200 system, if the designated mobile unit has some information to send to the host computer 17, that information is immediately transmitted to the host as the response, in which case the base station remains in reception mode. In effect, for the RT1200 system, any of the reception intervals 22, 24, 26, etc. will be extended so as to receive complete messages from the respective addressed terminals where such messages are ready to be sent in response to the respective polling transmissions 21, 23, 25, 27, etc. In FIG. 2, it is assumed that mobile unit #3 is the first unit with a message to send. In this case, the base station while in receive mode as indicated at 28, will actually receive a transmission from mobile unit #3 indicating that a message will follow. The base station in response to the transmission from mobile unit #3 (which is signified by a second line 28A in FIG. 2) remains in receive mode for the duration of the message from unit #3. The message itself from unit #3 may occur over a time interval as represented by dot-dash line 28B, and may be followed by an end of message transmission from unit #3 as indicated by a second line at 28C. In response to the end of message signal at 28C, the base station switches to transmit mode and transmits an acknowledgement message as indicated at 29 for advising unit #3 that the message was properly received.

The base station then resumes polling, e.g. transmitting a polling signal at 30 addressed to a mobile unit #4 and switching to receive mode for an interval 31, and so on. In order to minimize channel capacity that is wasted polling inactive terminals, activity time-outs may be employed so that units that have not transmitted are dropped from the polling sequence and placed in a contention queue. The assumption would be that inactive units are either not being used at all or that the operator is busy at some other activity for significant amounts of time.

Figure 3:
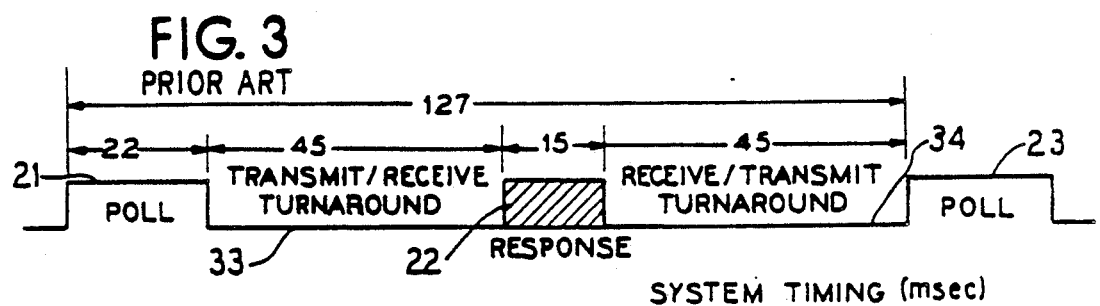
FIG. 3 is a diagram illustrating the system timing for the prior art system of FIGS. 1 and 2.

FIG. 3 illustrates standard system timing (in milliseconds) for the RT1200 system as represented in FIGS. 1 and 2. As indicated, a polling sequence such as indicated at 21 and 22 in FIG. 2 may occupy an overall time interval of 127 milliseconds, with a poll interval corresponding to interval 21 in FIG. 2 requiring twenty-two milliseconds, a transmit/receive turnaround interval such as represented at 33 in FIG. 2 requiring forty-five milliseconds, and a receive interval such as indicated at 22 in FIG. 2 being alloted fifteen milliseconds.

Figure 4:
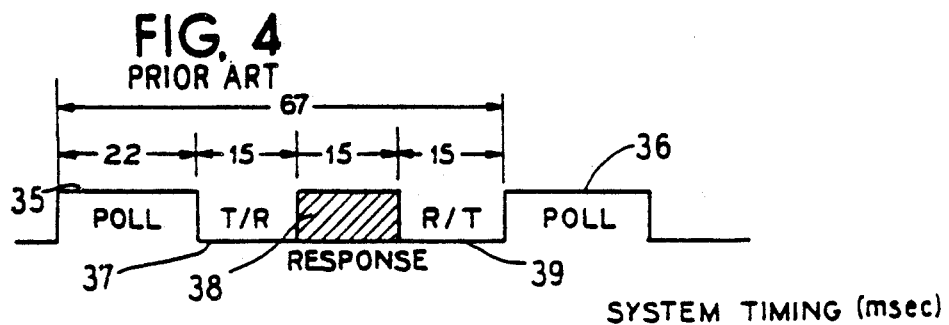
FIG. 4 is a diagram similar to FIG. 3 and illustrating system timing for a prior art system having nearly twice the polling speed of the system of FIGS. 1-3.

FIG. 4 illustrates the corresponding standard system timing (in milliseconds) for a second product family known as the RT2200 system of Norand Corporation. In this case, a standard cycle corresponding to the intervals 21, 33, 22 and 34 in FIG. 3 requires a total of sixty-seven milliseconds, polling intervals such as 35 and 36 requiring twenty-two milliseconds, and intervals 37, 38 and 39 each requiring fifteen milliseconds. The shorter transmit to receive and receive to transmit times offered by the RT2200 system result in nearly twice the polling speed in comparison to the RT1200 system. The modulation method and communication bit rates are identical in the two system families so that it is possible for the components of the RT1200 and RT2200 systems to be mixed subject to some limitations. For example, any mix of terminals or bases that includes an RT1211 multiplexor or an RT1212 base requires that the forty-five millisecond intervals such as 33 and 34 be included during communication involving these components. More particularly, if either the RT1212 base station or RT1211 multiplexor is used with a mixture of RT1210 and RT2210 terminals, all terminals must respond using the slower (45 ms) delay. If these units are replaced with both the RB2212 base, and RM2216 multiplexor, the system has the capability of adjusting the delay to match the particular terminals in use. For example, if units #1, #5, and #7 are RT2210's, and units #2, #3, #4, and #6 are RT1210's, the former three will be polled using the 15 ms delay, the latter four will be polled using the 45 ms delay.

Description of FIG. 5

In a more recent commercial development, a mobile terminal unit is to be utilized that includes a high performance 16-bit microprocessor and a memory capacity that allows large and complex application programs to reside and be executed within the terminal. With the introduction of this terminal, two new radio protocols have been developed. Both protocols use the slotted reservation approach for obtaining system access. The major difference between them is that one utilizes asynchronous data transmission which is backwards compatible with the hardware in the 2210, whereas the other will utilize synchronous data transmission, which is more efficient, but which requires specific hardware utilized only in the new terminal. The same slotted reservation access and data rate selection schemes are to be used with both protocols. Implementation of the new protocol in the RT2210 terminals requires a change of read only memory (ROM). Implementation in the new terminal consists of a downloaded program resident in nonvolatile random access memory (RAM).

As shown in FIG. 5 a general poll message such as indicated at 40 is transmitted to all terminals in the system, and the terminals are allowed to respond in random "time slots" such as indicated at 41-44 to indicate to the controller that communication activity is desired by the terminal. The example in FIG. 5 provides four time slots 41-44 in which the terminals may respond to the poll. In practice, the number of time slots are varied depending on the traffic load and other conditions. Each terminal may respond to the poll 40 in any of the desired time slots with its address and some positive acknowledgement. The particular time slot in which the terminal chooses to communicate is selected at random by the terminal. In the event that several terminals—potentially more than the number of time slots available, desire communications, a good probability may remain that at least one of the terminals will transmit its response in a time slot which is free of other responses. Under light loading conditions, it is likely that more than one slot will contain an intelligible response message, which further improves the efficiency of the polling procedure. An additional efficiency improvement may be realized because of a "capture" phenomenon of radio frequency modulation that allows recovery of a relatively strong signal in the presence of a relatively weak interfering signal.

Referring to FIG. 5, it may be that a terminal unit with an address of #3 responded during the first time slot 41, and that a terminal unit #0 responded in time slot 43. Several terminal units may have simultaneously responded in time slot 42 such that none was identified by the base station. In such a case, the base station after elapse of time intervals 41-44, may first transmit a polling signal 51 addressed to terminal unit #3, and then receive a message from unit #3 as indicated at 52. As in FIG. 2, the message received at 52 may include a preamble indicated at 52A, a message proper 52B, and an end of message signal 52C. The base station may then transmit an acknowledgement message as represented at 53, and thereafter proceed during time interval 54 to poll the next terminal unit, e.g. #0, which successfully responded to the general poll at 40. The message from terminal unit #0 may include message components such as described for message 52. After each successfully responding mobile terminal has been polled and its respective message received, the procedure may be repeated with a further general polling cycle as at 40-44.

Figure 6:
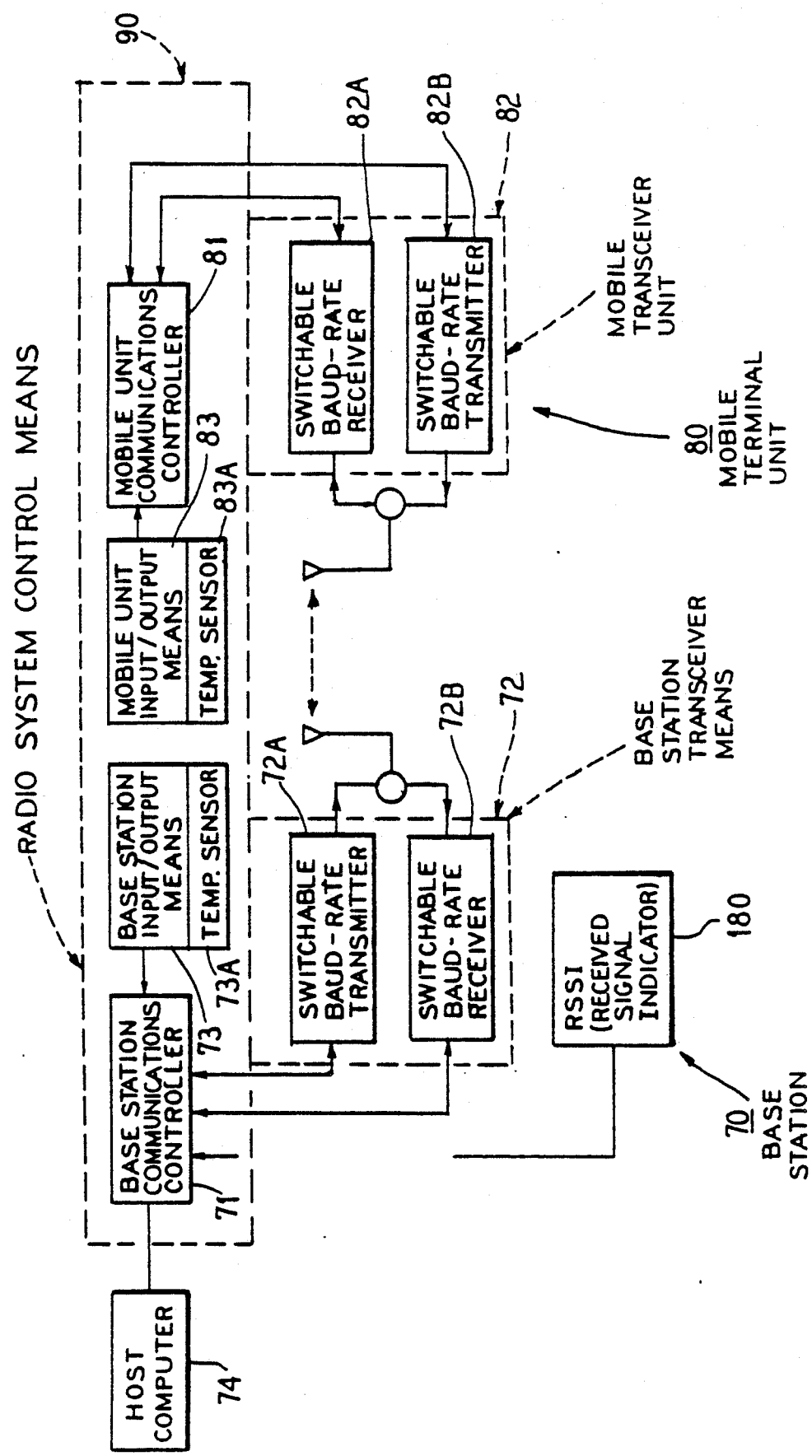
FIG. 6 is a diagrammatic illustration of a mobile radio system which may be compatible with elements of the previous systems of FIGS. 1 through 5, and may substantially enhance system throughput.

Description of FIG. 6

A radio data system utilizing the present invention is shown in FIG. 6. Such a system may be compatible with the product families as represented in FIGS. 1-5. Thus if the system of FIG. 6 utilizes a base station 70 capable of operating at either 4800 bits per second or 9600 bits per second under the control of a communications controller 71, such a base station can be installed in one of the prior systems e.g. in place of a RB2212 base transceiver, and may operate at a fixed data rate of 4800 bits per second. Subsequently, if upgraded mobile terminal units 80 and terminal communications controller means 81 are introduced into the system, operation at 9600 bits per second becomes available so as to achieve increased system performance. Communication at 9600 bits per second generally requires a stronger radio signal than communication at 4800 bits per second, so that the system of FIG. 6 may be designed to recognize when the signal strength is insufficient and to automatically switch to 4800 bits per second. Eventually, the system can be upgraded so as to utilize terminal units such as 80 exclusively. The 4800 bits per second data rate offers both the potential for direct compatibility with earlier products, and a "fall back" mode if signal strength does not allow communication at 9600 bits per second. A system such as indicated in FIG. 6 can be reached in stages with each upgrade step providing the user with increased performance and productivity that justifies the incremental cost. Since the largest investment is in the terminals, the upgrade strategy minimizes terminal obsolescence, offering the greatest possible useful life of the users' investment.

In a system such as indicated in FIG. 6, the transmitter and receiver components 72A, 72B and 82A, 82B may be switchable between data rates which are related by a factor of two, so that hardware complexity can be minimized. It would be possible to extend the concept to utilize a third data rate e.g. 1200 baud or 2400 baud for further enhancement of fringe performance. In a preferred system each remote unit such as 80 is identified by a unique address. Transmission between the base and the remote units may be initiated by the controller 71 through the use of sequential polling as in FIG. 2 or by means of a contention protocol such as represented in FIG. 5.

In the system of FIG. 6, polling signals such as indicated at 21, 23, 25, 27, FIG. 2 and such as indicated at 40, 51 and 54 in FIG. 5 may be at the standard data rate, e.g. 4800 baud, with terminals switching to 9600 baud when a message transmission is required for example in the case of mobile unit #3 during the interval 28 in FIG. 2. In FIG. 5, it may be assumed that mobile unit #3 was the sole respondent in interval 41 and mobile unit #0 was the sole respondent in time slot 43. In this case, the poll at interval 51 may be directed to mobile unit #3, and the response of mobile unit #3 during interval 52 may be at the high data rate e.g. 9600 baud. Similarly, the individual poll at interval 54 may be addressed to mobile unit #0, and mobile unit #0 may respond during an interval following the poll at 54 (corresponding to interval 52 following the poll at 51) at the high data rate e.g. 9600 baud. Polls are typically of short duration, so that the throughput penalty for using the lower data rate is relatively slight. Polling at 4800 baud also maintains backward compatibility with older equipment, and ensures that units operating under fringe (weak signal) conditions can have access to the base station.

In FIG. 6, the radio base station 70 may be described as comprising the base station controller means 71 and a base station transceiver means 72, and a base station input/output means 73. Controller means 71 may provide an interface with a host computer 74 similarly to the known commercial system of FIG. 1, and may also control the mode of operation and data rate of the base station transceiver means 72, and serve as an interface to the input/output means 73. The mobile terminal unit 80 may be described as comprising terminal controller means 81, mobile transceiver means 82 and terminal input/output means 83. The controller means 71 and 81 together may be considered to form a radio system control means as represented by dash line/rectangle 90, responsible for operating the system at a high data rate when feasible, and for automatically shifting to a lower data rate e.g. when a given mobile terminal unit moves beyond the range for reliable high data rate transmission.

The terminal controller means also includes means providing the interface to the terminal input/output means 83 as in the earlier versions heretofore described. The controller means 71 may operate the base transceiver 72 so as to execute sequential polling as in FIG. 2 for terminals such as shown in FIG. 1 and such polling and responses thereto will take place at the standard data rate e.g. 4800 baud. Since polling is typically of short duration, polling of the improved terminal units such as 80 may also take place at the standard data rate e.g. 4800 baud.

It is preferred to poll the improved terminal units such as 80 utilizing a contention poll as in FIG. 5 where there are large numbers of such terminal units with low to moderate activity rates since this procedure does not waste time polling units which do not have data to transmit. Under conditions of heavy usage, the controller means 90 may shift to the sequential polling procedure of FIG. 2 if an excessive number of collisions in the respective time slots prevents efficient communication in the FIG. 5 mode.

FIG. 6 illustrates that the base station may include a received signal strength indicator (RSSI) component 92. For characterizing signal strength using RSSI, several samples of signal strength would be made during receipt of a message and a computation to determine average signal strength would be made. This is necessary because of the multipath conditions typically found within buildings. A fixed threshold would be used for making data rate selection based upon signal strength. If signal strength is above threshold, the high rate would be used. If signal strength is below threshold, the low rate would be used.

Description of FIGS. 7A and 7B

FIG. 7A shows the case where base station 70 polls a terminal unit 80 at the standard data rate (represented by level "TX") during an interval 121, and has its receiver 72B in the high data rate (level "RXL" representing the standard data rate and level "RXH" representing the high data rate) for receiving a response during time interval 122. FIG. 7B represents a polled mobile unit corresponding to unit 80, FIG. 6, but which would not require a switchable data rate receiver. Thus the mobile unit of FIG. 7B would be in a fixed standard data rate receive mode (RX) during time interval 131, and would switch to high data rate transmit mode (TXH) for transmitting a response message during time interval 132. As in FIGS. 2 and 5, if the base station properly received the message at the high data rate, the base could transmit an acknowledgement at the standard data rate (TX) during interval 141, the mobile unit being in the standard data rate receive mode (RX) as represented at 151.

Exemplary Operation for a System According to FIGS. 1-3 or 4-5 and FIGS. 6, 7A and 7B In the exemplary mode of operation of FIGS. 7A and 7B, with sequential polling, polling would take place at the standard data rate, e.g. 4800 baud, in time intervals such as indicated at 21, 23, 25, 27 and 30, FIG. 2, and at 121, FIG. 7A. The base station could be programmed with the data rate capacities of the respective terminal units, and always switch to receive at the standard data rate after polling of a fixed data rate terminal as in FIG. 2. If, for example, terminal units #0, #1 and #2 were of the fixed data rate type, then receiver 72B would be conditioned to receive response messages at the standard data rate during response time intervals 22, 24 and 26.

If terminal unit #3 were of the type shown at 80 in FIG. 6, the base station would be programmed to send the poll during time interval 121, FIG. 7A, at the standard data rate and then in a default mode (in the absence of a definite event indicating a lower data rate) would switch its receiver 82A to receive at a higher data rate during the response time interval 122. Each mobile unit such as 80, FIG. 6, in default mode, could have its transmitter 82B ready to transmit during an interval such as 132 at a higher data rate than the standard data rate. Where the standard data rate is 4800 baud, it is preferred to utilize a higher data rate of twice the standard data rate, i.e. 9600 baud, for a communications system such as here described, since such a relationship makes the switchable baseband transmit and receive circuitry simpler. The receiver 82A would not need to be switchable but could be fixed to receive at the standard data rate, e.g. 4800 baud, as at 131. In this case, a mobile unit such as 80 with address #3 would receive the poll during time interval 131, and be ready to transmit its message at a higher data rate, e.g. 9600 baud. In correspondence with FIG. 4, the mobile terminal unit may switch from receive to transmit (R/T) mode in fifteen milliseconds during interval 160.

The base station 70 may receive the high data rate message and issue an acknowledgement at the standard data rate during interval 141. If the message is received with an unacceptable number of errors, controller 71 may be programmed to transmit a switchover signal to mobile unit #3, e.g. during interval 141, commanding that the message be retransmitted at the standard data rate, and storing a corresponding switchover command in its polling control memory e.g. when the switchover command is acknowledged by unit #3 as at 162. In the case of a mobile terminal of a passive type, mobile unit #3 could then have its transmitter 82B operate in the standard data rate mode until a new startup of operation, e.g. on a subsequent working day, or until it received a special switchback signal from the base station.

During standard data rate mode, mobile unit #3 even with no message to transmit, would operate so as to receive any messages directed to it by the base station. Once the base station had registered a given mobile unit, e.g. #3, as having switched to transmission at the standard data rate, the base station could execute a program controlling a tentative resetting of such mobile unit to a higher data rate. In a simple case, the base station could instruct the mobile unit to attempt a high data rate transmission by sending a switchback polling message during an interval such as 27, FIG. 2, or 51, FIG. 5, after the expiration of a given number of polling cycles. If message traffic was heavy, each polling cycle would tend to be of longer duration, reducing the frequency of such high data rate trials.

Description of FIGS. 8A and 8B

A mobile unit such as 80 may include a temperature sensor for sensing ambient temperature. Such a temperature sensor may be associated with the terminal input/output means as indicated at 83A, FIG. 6. Such a temperature sensor may be incorporated in the mobile terminal unit for use in connection with digitally controlled oscillator compensation, bias compensation of liquid crystal displays, or over/under temperature sense and shutdown, for example.

The temperature sensor 83A is useful in controlling data rate since temperature changes at the transmitter 82B can cause a shifting of the frequency of the RF carrier.

The base station input/output means 73 may also include a temperature sensor 73A, and a digital measure of ambient temperature at the base is useful in controlling data rate since the local oscillator frequency of receiver 72B is affected by temperature.

It is advantageous to communicate the temperature of the base unit 71 to the mobile unit 80, so that the mobile unit can obtain a measure of any differential in ambient temperature between the mobile unit and the base. As the magnitude of the temperature differential begins to become large, the received high data rate signal becomes skewed (relative to the center of the IF filter passband). This results in distortion in the recovered data, which eventually with increasing magnitude of the frequency error makes data recovery impossible. Signals with higher frequency components are more vulnerable to this effect, so that operation may still be feasible at the standard data rate.

Knowing the temperature of the unit, and the approximate average temperature profile, there are a few alternative ways to aid data rate selection. A preferred way would be to break the operating temperature range into three regions where the frequency is likely to be either near its nominal value, high, or low. In the system of FIGS. 8A and 8B, the nominal region(s) might encompass the temperature range where the frequency is likely to be within +/−1 KHz which is about +/−2 ppm at 450 MHz, or +/−0.8 ppm at 800 MHz. The high region(s) would be those where the frequency is likely to be above this value, the remainder would be classified as low regions. A simple high, nominal, or low indication would be communicated over the link for use in establishing data rate. Because of the statistical nature of the temperature profiles, the only time that temperature information would be heavily utilized to make a data rate decision would be when two units wishing to communicate were at opposite extremes, e.g. high and low, or low and high.

From a practical standpoint, it is more efficient for each portable unit to make the determination as to the magnitude of the temperature differential relative to the base, since in this case, the base can transmit its temperature information to all mobile units once each polling cycle, minimizing system overhead. If the portable unit determines that base and portable frequency error are at opposite extremes data rate will revert to the standard rate.

For the case of sequential polling, temperature information from the base station 70, FIG. 6, can be transmitted during an interval such as indicated at 171, FIG. 8A, prior to polling of a first mobile unit as at 172, FIG. 8A. In a contention type polling procedure, temperature information from the base station 70 can be transmitted as indicated at 174, FIG. 8B, prior to a general poll at interval 175.

Each mobile unit having a message to transmit will evaluate the temperature condition at the base 70 in relation to its ambient temperature as sensed at 83A, FIG. 6, and determine the correct data rate for its message. For example, the first mobile unit may respond to its poll at 172, FIG. 8A, by transmitting a signal during interval 176, FIG. 8A, indicating whether its message will be sent at the standard data rate or at the higher data rate. The base station will then operate its receiver 72B to receive the message during interval 177.

Similarly for the case of FIG. 8B, each mobile unit such as 80 having a message to transmit will evaluate the base temperature information in relation to its ambient temperature, and respond in a selected time slot such as 178 with a message indicating its address and whether its message will be transmitted at the standard data rate or at the higher data rate. Then when such mobile unit is individually polled by the base as at 179, it will proceed to send its message at the selected data rate.

In FIG. 8B, the temperature information and general poll signal may be combined so as to be transmitted as a unitary signal burst e.g. during the general poll interval 175, so that the separate transmission interval 174 may be omitted.

Description of FIGS. 9A and 9B

For the case of sequential polling, FIG. 9A shows the polling at 181 of a mobile unit such as 80, FIG. 6, whose transmitter 82B has been switched over to the low data rate mode, for example as described in reference to FIG. 7A and 7B. Where the mobile unit has a message to send, it may affirm this in interval 182 by means of a test precursor signal at the low data rate during interval 182. This signal at 182 causes the base station to switch to high data rate reception at 183, whereupon the mobile unit sends a test pattern at the high data rate during the corresponding interval 193. Ideally a special test pattern would be sent during interval 193 which was designed to be particularly sensitive to marginal transmission conditions. If the test pattern were sent prior to the message to be transmitted, then the mobile unit could pause as at 194 to receive approval of its test pattern transmission from the base before proceeding to send its message, so that the message could be sent selectively at the high data rate or at the standard data rate depending on the decision signal from the base at 195 in reference to the test pattern.

Thus, if the base sends a switchback signal at 195, the mobile unit switches to the high data rate (TXH) and sends its message as indicated at 198.

For the case of contention polling, the mobile unit would first respond as in FIG. 5, and at the interval such as 52A, FIG. 5, send the test precursor signal as at 182, FIG. 9B. Again the data message would be sent at the high data rate (as at 198, FIG. 9B) if the high data rate test pattern (as at 193) was approved by the base (as at 195).

For either sequential or contention polling, the mobile unit could omit the high data rate test pattern and simply resume operation at the high data rate until otherwise instructed by the base.

The test precursor signal at 182, FIG. 9B, could include temperature information as described for interval 171, FIG. 8A, or 174, FIG. 8B, so that FIGS. 9A, 9B could include the features of FIGS. 8A, 8B also.

As explained in reference to FIGS. 8A and 8B, it is advantageous if the base can send a data rate decision-relevant signal to all remote units simultaneously in the process of dynamic data rate selection. Thus in FIG. 8A, the transmission at 171 may include or consist of any of the test signals disclosed herein. For the case of FIG. 8B, any such test signal may be transmitted at the low or standard data rate in interval 174, or may be included in or comprise the general poll signal at 175. Alternatively a high data rate test signal may be sent at an interval corresponding to interval 171, FIG. 8A, or interval 174, FIG. 8B.

Description of FIGS. 10 and 11

FIGS. 10 and 11 illustrate embodiments where a switchable baud rate transmitter is utilized as indicated at 72A, FIG. 6, to send a special high data rate test pattern.

For the case of sequential polling as represented in FIG. 10, the base station may send the high data rate test pattern as indicated at 201, interlaced with its regular polling of respective mobile units as at 202. If for example, mobile unit #0 received the test pattern properly, and had a message to transmit it could respond at interval 203 with a switch to high data rate signal, and thereafter send its message at the high data rate, for reception during time interval 204. If the test pattern had not been received properly, the mobile unit #0 would respond at the low data rate to be received as indicated at 28 in FIG. 2. The switch over between transmission at high and low data rates as at 206, FIG. 10, or as at 207, FIG. 9B, would have a duration so as to provide a suitable stabilization period. The required delay for data rate switchover is dependent on the hardware implementation in both the transmitting and receiving equipment.

For the case of contention polling as in FIG. 11, a high data rate test pattern may be sent during a time interval 210 which precedes or follows the general poll at 211. For example, as shown in FIG. 11, the high data test rate pattern may occur during an interval corresponding to the first response time slot such as 41, FIG. 5, in which case all mobile units would be programmed to avoid selection of this slot for contention purposes.

Where the test pattern preceded the general poll as at 40, FIG. 5, each mobile unit would switch to high data rate reception after receiving an acknowledgement as at 53, FIG. 5, or for mobile units with no message to send, these units could remain in low data rate reception mode until data was ready to send, and then switch to high data rate reception to determine if high data rate transmission was feasible (i.e. by evaluating reception of the test pattern transmitted by the base).

Figure 12:
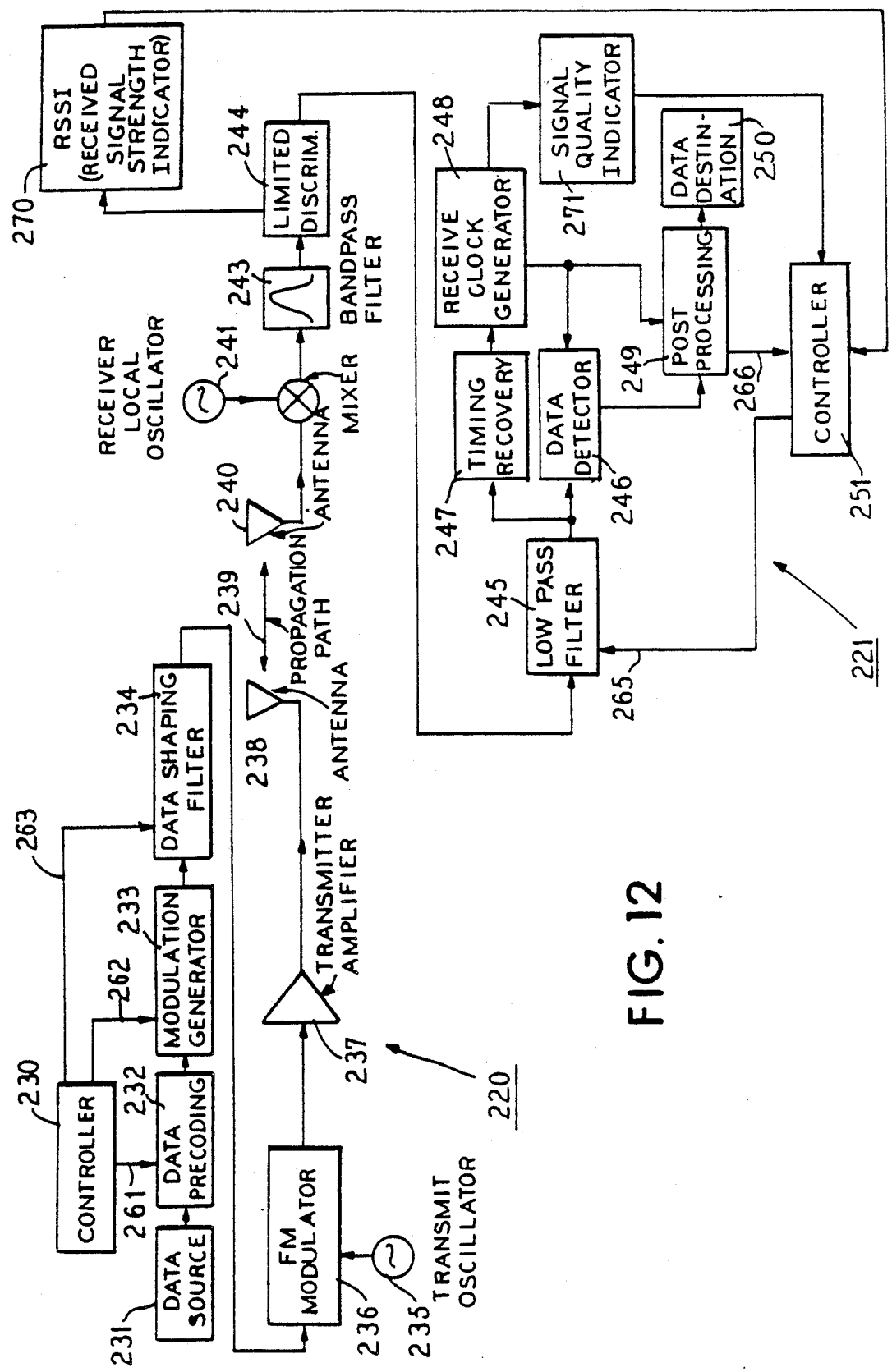
FIG. 12 is a schematic block diagram for illustrating an exemplary hardware implementation of the system of FIG. 6.

Description of FIG. 12

FIG. 12 shows exemplary relevant details for a transmitter 220 which may correspond with transmitter 72A or 82B, FIG. 6, and for a receiver 221 which may correspond with receiver 72B or 82A, FIG. 6. The reference numerals in FIG. 12 designate elements of the system as follows: 230, communications controller; 231, data source; 232, preprocessing and encoding section; 233, modulation generator; 234, data shaping filter; 235, transmitter oscillator; 236, FM modulator; 237, transmitter amplifier; 238, antenna; 239, propagation path; 240, antenna; 241, receiver local oscillator; 242, down conversion mixer; 243, intermediate frequency (IF) bandpass filter; 244, limiter/discriminator demodulator; 245, bandlimiting low pass filter; 246, baseband data detector; 247, timing recovery section; 248, clock generator; 249, data post processing section; 250, data destination; 251, communications controller. A description of an exemplary implementation of the baseband processing components is as follows:

(1) Digital Pre-processing Section 232

This function is provided using a commercially available serial communications controller (SCC). This device is programmable under software control so data rate may be changed without the need for additional hardware. The SCC accepts raw data in parallel form, adds system overhead functions, such as framing, error detection, and control bits, and clocks out serial data at the proper baud rate. It also controls operation (on/off) of the transmitter.

(2) Modulation Generator 233

The NRZ formatted data supplied by the serial communications controller of section 232 is a single ended logic level signal. Modulation generator 233 includes a level translator which converts this input signal to a signal which is symmetrical around a d.c. reference voltage. This reference is used for the remainder of the baseband analog processing circuitry.

The signal from the level translator is supplied to a level adjust circuit which may comprise a simple resistive attenuator for scaling the signal to provide the proper FM deviation of the carrier. In the exemplary FM data transmission system, occupied bandwidth is sixteen kilohertz maximum, with five kilohertz maximum frequency deviation. This occupied band width constraint restricts the allowed deviation at higher data rates. The need to adjust deviation for the different data rates is brought about by a combination of system considerations, (optimizing deviation to maximize link performance at the individual data rates) and regulatory restrictions on maximum occupied bandwidth.

In the exemplary system the circuit is designed to switch the attenuation to optimize the deviation for each data rate. In particular, the level adjust circuit is designed to switch in additional attenuation when 9600 baud operation is desired. Control line 261, FIG. 12, may control the serial communications controller to effect the change of data rate between 4800 baud and 9600 baud, for example, and control line 262 may correspondingly control the switching in of additional attenuation for 9600 baud operation.

(3) Terminal Data Shaping Filter 234

The data shaping filter may comprise a linear phase response low pass filter with a passband-width matched to the data rate. Its purpose is to minimize the occupied bandwidth of the transmitted signal. A switched capacitor filter implementation is used in the design which allows the bandwidth to be adjusted for 4800 baud or 9600 baud operation simply by changing an externally provided clock which may be provided from controller 230 via line 263, FIG. 12. The filtered signal is supplied to the radio transmitter FM modulator 236 for RF transmission.

(4) Receive Low Pass Filter Circuit 245

An input circuit to the low pass filter proper may provide an amplitude adjustment so that the incoming signal from limiter-discriminator demodulator 244 can be set to the proper level for the low pass filter and data recovery detector circuits to follow. The purpose of the receive filter is to minimize intersymbol interference at the receive data recovery circuitry. It also provides a d.c. offset to center the signal within the input range of the low pass filter and zero crossing detector. The low pass filter itself may be a switched capacitor linear phase filter similar to the filter used in component 234 of the transmitter. Its purpose is to remove noise components which are outside of the data bandwidth. The bandwidth of this filter is determined by an external clock signal supplied via a line 265, FIG. 12, from controller 251.

(5) Receive Data Recovery Circuitry 247

This circuitry may function as a zero crossing detector and may comprise a reference recovery circuit and a comparator with hysteresis. The d.c. bias voltage from the filter circuit 245 varies in proportion to the total frequency error in the received signal and local oscillators (the same phenomenon that causes skewing in the IF filters 243). The reference recovery circuit tracks the signal and extracts a reference signal which is applied to the comparator. The comparator compares the incoming signal against the reference to detect zero crossings in the data. Hysteresis is utilized to provide additional noise immunity under weak signal conditions.

A zero crossing detection approach is considered advantageous because it is relatively insensitive to the amplitude distortion that occurs in the receiver at the 9600 baud data rate. Such a circuit is selected because its operation is relatively data rate independent. It can be used at 4800 baud or 9600 baud without adjustment.

(6) Timing Recovery and Clock Generator

The function of the timing recovery circuit is to synchronize a locally generated data clock signal with the incoming NRZ data. Possible implementations include an early-late gate or phase locked loop. By continuously monitoring the degree of coincidence of received data transitions and the recovered clock signal, a signal quality indication can be derived for use in making data rate selection decisions. The recovered clock signal may be used to gate the data recovery circuit at the center of each received bit, which may provide improved performance at the expense of more complex hardware.

Timing recovery may be performed in parallel with data recovery as shown in FIG. 12, or serially, following data recovery.

(7) Digital Post-Processing

As with component 232 of the transmitter, this function may be implemented in a serial communications controller. The primary functions of this device are to remove system overhead information that was added for transmission, perform error control analysis, and provide the raw data to the data destination. It may also be used to perform some or all of the timing recovery function, if the serial implementation is selected. Data rate is programmable under software control and may be controlled from controller 251 as represented by control line 266.

Data source 231 and data destination 250 may be implemented as a universal asynchronous receive/transmit circuit (UART) which supplies data to the component 232 during transmitting operation and which receives data from post-processing component 249 during reception operation. The controller such as 230 or 251 may be connected in parallel with such a UART component for inputting data thereto for transmission, and for receiving data therefrom, in parallel, during reception. Alternatively, data may be provided to the controller via direct memory access or DMA. In this approach the serial communications controller stores the received data in a designated memory location where it can be directly retrieved by the controller.

It will be understood by those skilled in the art that in practice, the timing recovery section 247, clock generator 248, and the controller components may all be implemented in a single microprocessor, as would a portion of the receiver post-processing section 249.

The circuitry of FIG. 12 represents a narrow band frequency modulation (FM) radio data communications system.

FIG. 12 shows a received signal strength indicator (RSSI) 270 associated with the limiter-discriminator section 244, and a signal quality indicator 271 associated with the clock generator 248. Components 270 and 271 will now be discussed in separately headed sections.

(1) RSSI Component 270

Several integrated circuit FM demodulators now incorporate the RSSI function. In operation, an output voltage or current is provided proportional to the degree of limiting in the limiter portion of the integrated circuitry. The RSSI output may be applied to an analog to digital converter and then to the microprocessor of a controller such as 71 or 81, FIG. 6, or 251, FIG. 12. The programming of the microprocessor of the controller may then determine the presence and signal strength of the carrier, and make a decision as to whether it is desirable to revert to the lower data rate. The individual polling signals such as 21, 23, 25, 27 in FIG. 2 and such as 51 and 54 in FIG. 5 may take a special form for signaling the respective addressed terminal unit that messages are to transmitted at the lower data rate until further notice. Since other factors than signal strength influence the ability to use higher data rates, such as skewing of the received signal frequency and receiver local oscillators due to temperature. It is conceived that other criteria may be utilized along with received signal strength to determine when switching to the lower data rate is advisable.

In evaluating multipath effects the RSSI output should be sampled several times during receipt of a message. Data rate selection should be based upon a weighted average value. The weighting function should give emphasis to the lower signal strengths measured since the average strength of a fading signal tends to approximate its peak value.

(2) Signal Quality Indicator 271

A preferred method of evaluating whether to switch to a low data rate is to use a signal quality indicator derived from the receive clock generator 248. This indicator would produce a signal by comparing the regenerated receive clock which would contain some amount of jitter due to noise and distortion in the radio link, with the ideal clock. A test pattern as described with reference to FIGS. 9A, 9B, 10 and 11 would most likely still be advantageous so as to make the measurement more reliable and sensitive.

The receiving unit performs a qualitative analysis of the 9600 baud signal, e.g. a special test pattern, by sensing the jitter in the received signal. The majority of the signal quality indicator circuit 271 can easily be implemented in any one of a number of commercially available programmable logic devices. The control portion may utilize the onboard microcomputer of the controller 251. Alternatively, the entire jitter characterization function could be implemented in software given a sufficiently powerful microcomputer.

By way of example, the test pattern may consist of an initialization sequence used to establish timing, and a known bit pattern. The jitter characterization circuit 271 is held in a standby mode until the initialization sequence is expected. The initialization sequence may consist of an alternating pattern of eight ones and zeros. A clock pattern can be used for synchronization because the time uncertainty of the beginning of the sequence is slight. If uncertainty were greater a seven bit Barker sequence could be used.

For timing synchronization, the circuit functions as a sliding correlator. A bit image of the ideal timing initialization sequence sampled at seven samples per bit (11111110000000 . . . ) is loaded from the pattern memory into the compare register. The incoming data is sampled as shifted into the shift register at seven times the bit rate. After each shift operation, the shift register and compare register are exclusive or-ed, and the degree of correlation (number of errors) determined. This continues until the number of errors detected is less than a maximum error threshold (in this case thirteen errors). At that point, the shift operation continues as long as the number of errors continues to decrease. When an increase in the number of errors is noted, synchronization is assumed to have occurred on the previous clock sample. If the number of detected errors does not decrease to below the threshold within a timeout period, the remainder of the data characterization is not performed, and e.g. 4800 baud operation is used.

Once clock synchronization has been obtained, the circuit enters a block correlation mode. A fifty-six bit image of the first eight bits of the pseudorandom test pattern is loaded into the comparison register. Incoming data is clocked in for the next fifty-five clock cycles. (Fifty-five cycles are used for the first comparison because the bit synchronization is one clock cycle off. Thereafter, fifty-six cycles are used.) At the end of the clock period, the shift register and compare registers are exclusive or-ed, and the number of errors determined. The next fifty-six bit image is then loaded into the comparison register and the next fifty-six samples are shifted in. This process continues for the duration of the test pattern.

A running total of the number of detected errors, including those noted in the synchronization process, is maintained throughout the characterization process. At the conclusion of the process, the total number of errors is compared against a threshold value to make the data rate decision. The threshold for selecting e.g. 9600 baud operation is sixty errors out of two hundred eighty samples or twenty-one percent. If the error percentage is above this level, e.g. 4800 baud operation is used.

For embodiments such as shown is FIGS. 10 and 11, the data rate selection must be communicated to the base station controller means such as 71 in the poll response. This response could also contain a test sequence to characterize the return link as in FIG. 9B. If a reciprocal channel is present, characterization of one of the links only may generally be adequate to establish the data rate, and would result in lower system overhead.

The length of the pseudo-random test pattern used is somewhat arbitrary. An initial design uses a pattern of a length of forty bits, including eight bits for synchronization. The forty bit pattern length was selected because it represents a good compromise between signal characterization and low system overhead. It is more than adequate to characterize the degradation of the link due to poor signal strength and distortion in the channel.

If a signal quality indicator is available from the received clock generator, the use of a correlator is a redundant function. The test pattern could be used in either case.

General Discussion of FIG. 12

FIG. 12 particularly illustrates a system for upgrading the present commercial system as described in reference to FIGS. 1-5.

Thus, the system of FIG. 12 may be operated so as to be compatible with the earlier mobile units of FIGS. 1, 2 and 3 which form part of the commercial RT1200 system, and may also utilize terminals as represented in FIG. 4 forming part of the RT2200 commercial system. To accomodate such mobile terminal units, the system of FIG. 12 may conduct its polling operations at the standard data rate of 4800 baud. Thus, the system of FIG. 12 is particularly adapted for use in inventory management and material control applications in retail stores, warehousing, and manufacturing, for example, allowing operators at remote locations to communicate interactively with a central computer system on a real-time basis.

The radio system of FIG. 12 may utilize a star network configuration. The base station may comprise receive and transmit sections as in FIG. 12 and may utilize a single communications controller for performing the functions of controllers 230 and 251, FIG. 12. Accordingly, the single communications controller of the base station may correspond with controller 71, FIG. 6, and provide a data interface to a host computer such as represented at 74, FIG. 6. Thus, data from the single controller is converted into a radio frequency signal, and signals received from remote units of the two commercial types and from remote units as represented in FIG. 12 are converted into logic level signals and provided to the single controller.

The remote units of the three different kinds are designed to be operated in a common system and each may be used either as a hand-held portable device or as a mobile unit on a forklift or other vehicle. Each remote unit has the capability of working with a variety of peripheral devices, the most common of which are various types of barcode scanners. The remote units may utilize an integral microcomputer for performing the functions of controllers such as 230, 251, FIG. 12, and such integral microcomputer then controls operation of the remote unit and provides local processing of user and peripheral device inputs.

The system of FIG. 12 particularly relates to data communications in the ultra-high frequency (UHF) frequency range. While several different modulation methods would be permitted, frequency modulation (FM) is illustrated in FIG. 12. Equipment operating under these conditions in the United States is subject to the following limitations:

(1) Occupied band width is sixteen kilohertz maximum, with five kilohertz maximum frequency deviation.

(2) Channel spacing is 25 kilohertz. This requires the use of highly selected filtering in the receiver to reduce the potential for interference from nearby radio equipment operating on adjacent channels.

(3) Maximum output power is generally in the range of ten to three hundred watts. For localized operation in a fixed location, however, transmitter power output may be limited to two watts maximum, and limitations may be placed on antenna height as well. These restrictions are intended to limit system range so as to allow efficient re-use of frequencies.

For non-return to zero (NRZ) data modulation, the highest modulating frequency is equal to one half the data rate in baud. Maximum deviation of five kilohertz may be utilized for a highest modulation frequency which is less than three kilohertz, but lower deviations are generally required for higher modulation frequencies. Thus, at a data rate of ten thousand baud, and an occupied bandwidth of sixteen kilohertz, the peak FM deviation which can be utilized for NRZ data may be three kilohertz or less.

Considerations of cost versus performance tradeoffs are the major reason for the selection of the frequency modulation approach used in the system. The approach utilizes shaped non-return-to-zero (NRZ) data for bandwidth efficiency and non-coherent demodulation using a limiter-discriminator detector for reasonable performance at weak RF signal levels.

The radio transceivers in the base and remote units have been derived from design configurations originally devised for voice equipment, thereby taking advantage of the existing components developed for that market. While the performance of these modules has been optimized specifically for data, cost considerations have dictated that performance goals be compromised in some areas, particularly transmitter and receiver local oscillator frequency stabilities and IF filter characteristics.

For example, in the illustrated embodiment, transmit oscillator 235 and receiver local oscillator 241 may have a frequency stability over a temperature range from minus thirty degrees celsius to plus sixty degrees celsius of five parts per million (0.0005 percent).

The IF filter 243 is selected to pass the modulated signal with fidelity, and to provide the required adjacent channel selectivity. The filter pass band must be wide enough to accomodate center frequency errors due to the transmitter and receiver frequency tolerances noted above. Ideally, the filter should have linear pass band phase characteristics to avoid introducing delay distortion in the recovered data. Cost considerations have dictated performance compromises in filter selection. The filters used exhibit both amplitude roll-off and nonlinear phase characteristics near the edges of the pass band, which results in detectable intersymbol interference (ISI) in the recovered baseband signal at higher data rates, particularly when frequency offset error is present.

The following is a summary of some of the factors which prevent reliable continuous operation of the system of FIG. 12 at the higher data rate such as 9600 baud under all operating conditions:

(1) There is a sensitivity penalty for operating at higher data rates. For a given bit error rate (BER) the combination of higher baseband low pass filter bandwidths and lower bit energies dictates a need for a stronger signal at the receiver input than that required for lower data rates. This is compounded by the fact the occupied bandwidth restrictions force the use of lower than optimum deviation when higher data rates are utilized. If transmitter power is fixed by constraints such as regulations, cost, or battery life, this decrease in sensitivity translates directly into a decrease in system range.

(2) The twenty-five kilohertz channel spacing requirement has resulted in the use of narrow band IF filters in the receiver. These filters tend to provide amplitude roll-off of high frequency components in the recovered data. Furthermore, cost considerations have not allowed the use of filters with linear passband phase characteristics, and this results in delay distortion (jitter) in the recovered data. These effects are most pronounced for data signals with frequency components above three kilohertz.

(3) Changes in ambient temperature cause changes in the transmitter and receiver local oscillator frequencies. This tends to be least detrimental when a base and remote unit are at about the same temperature, and to be most detremental when they are at opposite temperature extremes. Also, repeated temperature cycling causes aging or long-term drift in the crystal frequency control elements over time. These two effects result in skewing of the received signal so that it is no longer centered in the IF filter, compounding the effects cited in the preceding paragraph (2).

(4) Because the system under discussion here is intended for use within single buildings or complexes of buildings, propagation anomalies such as shadow fading and Rayleigh fading are troublesome. These effects are generally worse for higher data rates both because of the shorter bit intervals involved (shorter integration time in the data recovery process) and because of the sensitivity degradation noted in the preceeding paragraph (1).

Because of the difficulties just noted, it is not possible to provide adequate system performance under all conditions in the intended applications at a relatively high data rate such as ten thousand baud. The use of a lower data rate such as 4800 baud provides improvements in system range and reliability even in comparison to a data rate of seven thousand baud. Field experience has proved that 4800 bits per second data rate is an excellent compromise for systems that employ limited numbers of remote units, and can tolerate the lower throughput rate. Switching the data rate between 4800 baud and 9600 baud instead of between 4800 baud and 10,000 baud, for example, is preferred because of lower cost.

Since some transceiver module designs that may be utilized in FIG. 12 do not have RSSI capabilities, it may be preferred to use the RSSI measurement as an optional or secondary indicator, the system still being effective in the absence of component 270, FIG. 12, but with slightly lower throughput efficiency. Where the RSSI measurement is utilized, it is considered desirable to sample the output of component 270 three to five times during a poll interval to gain an accurate indication of signal strength, e.g. to take account of signal fading effects. For initial message transmission, the default data rate to be used may be 9600 baud, unless the RSSI measurement indicates weak signal conditions. Thereafter, 9600 baud will continue to be used until low signal strength is detected, or a communication failure occurs. On failure, the system will revert to 4800 baud message transmission until a retry algorithm initiates another 9600 baud attempt.

The decision to retry the high data rate may be based on a number of factors in the embodiment of FIG. 12. If poor signal strength indication at component 270 dictates 4800 baud operation, then 9600 baud operation can be attempted as soon as signal strength improvement is noted. If 4800 baud was utilized because of 9600 baud communication failure, several factors can be considered in determining when to attempt 9600 baud operation again. These factors include:

(1) Elapsed time since the last 9600 baud attempt. Since remote units are generally hand held or mobile, factors which force the lower data rate are subject to change as the remote units are moved to different locations.

(2) Monitoring of 9600 baud transmissions from the base to other remote units. These transmissions can be used as test patterns to determine if 9600 baud transmissions can be received without errors.

(3) System traffic. If the system is lightly loaded, more frequent attempts at re-establishing 9600 baud communications can be made without introducing unacceptable degradations in system response time. In the sequential polled protocol loading can be determined by measuring the elapsed time between successive polls of a particular address. In the contention protocol, loading can be ascertained by monitoring the number of empty time slots (i.e. time slots in which no response message occurs).

(4) Number of message transmissions since the last 9600 baud attempt. That is, the algorithm may cause a retry of 9600 baud operation every fifth, or tenth or twentieth transmission.

(5) Internal temperature of the base and/or remote unit. Since many of the skewing effects of the IF filters are temperature related, continued temperature extremes (high temperature differential between base and mobile unit) could indicate less frequent retries at 9600 baud should be attempted. Temperature information is available in the remote units for use in other circuits, and can be utilized without introducing additional cost for the unit.

It is known in the art to utilize FM data equipment wherein one of several data rates may be selected by the system user at the time of system installation based upon propagation conditions of the particular installation. A significant disadvantage of the user-switchable approach results from the fact that in many mobile installations propagation conditions are not static, but are subject to dramatic change in the course of short periods of time. This is the case normally in systems utilizing mobile or portable devices. The key characteristics of the approach of the present disclosure, on the other hand, are:

(1) Dynamic adaptive data rate selection takes place automatically to increase data transmission efficiency and reliability where communication may be required under relatively strong and relatively weak signal conditions, and where propagation conditions may change rapidly.

(2) Handshaking between devices may be used to initiate a communications session and to establish the data rate for that session.

(3) Signal quality measurements for determining automatic switching may be based both on direct measurements of signal quality as represented at 271 in FIG. 12, and also on indirect measurements such as represented by the received signal strength indicator component 270, FIG. 12. Additional parameters may be readily introduced by programming.

(4) As shown in FIG. 12, performance characteristics of the baseband signal processing apparatus may be adapted to optimize the devices for communication using the respective different data rates.

(5) As shown in FIG. 12, a preferred approach may involve pre-modulation and post-demodulation signal processing operations only so that it is particularly cost effective to implement.

Discussion of the Use of a Test Pattern to Evaluate Susceptibility to Jitter

The signal quality indicator 271, FIG. 12, may detect jitter in the recovered data by multiple sampling of the recovered digital data stream e.g. from a test pattern at a rate of ten or more samples per bit to determine the extent to which the intervals between bit transitions differ from the nominal intervals for 9600 baud transmission. A disadvantage of this approach is that it is beyond the capabilities of the serial communications controller which is preferably utilized in post-processing section 249 and in the associated digital pre-processing component 232 of each transceiver. It can be implemented by providing the recovered data directly to the microcomputer of controller 251. For a presently available low cost microcomputer, this prevents the microcomputer from handling other tasks during the evaluation of the received test pattern. In this implementation, the test pattern can be relatively short, for example thirty-two bits.

A jitter characterization approach as already described with reference to component 271, FIG. 12, transmits a "worst case" data sequence which is specially selected to have a high susceptability to noise and distortion. If the serial communications controller (SCC) is able to decode the sequence, 9600 baud transmission is automatically selected. If it fails to decode the sequence, 4800 baud transmission is automatically used. The advantage of this jitter characterization approach is that it does not require the use of the microcomputer of the communications controller component. Using this approach requires a longer test pattern, perhaps several hundred bits.

Explanation of the General Concept of Handshaking and Its Application to Data Rate Selection According to the Present Invention The following generalized example explains how data rate selection may take place as between units which utilize a handshaking mode of communication. This example illustrates the application of the teachings of the foregoing embodiments without reference to the particular protocols of FIGS. 2 and 5.

GENERALIZED EXAMPLE (protocol independent)

Consider a radio system that consists of several unit, each with a unique address.
1) In the simplest case, the system may consist of two units, #1 and #2, one or both of which are mobile.
2) In a standby mode of operation both units program their receivers to receive at the low data rate.
3) When a unit has information to communicate, it switches to transmit at the standard rate, and sends a query to the other (target) unit. Following this transmission, the unit switches to once again receive at the standard rate.
4) If the target unit for some reason (e.g. out of range) does not correctly receive the query it makes no response. After a time out period, the initiating unit may periodically attempt to re-establish the link.
5) If the target unit correctly receives the transmission it performs an analysis to determine the quality of the radio link (propagation path and radio hardware). This may involve combinations of signal strength measurement, jitter in the received data, or use of information communicated in the transmission. A transmission which is to be evaluated as an aid to deciding on a dynamic basis whether a high data rate is feasible is herein termed a "test signal" or "test transmission." Based upon the results of the analysis, the unit determines whether to utilize the standard data rate or a higher rate for a subsequent communications session between the two units.

6) The target unit completes the handshake by switching to transmit at the standard rate and communicates its data rate selection to the initiating unit. It then switches to receive at either the standard or higher data rate depending on which it has selected.

7) The initiating unit, upon receipt of the return handshake, switches to transmit its message at the selected data rate.

8) Upon receipt of an end of message indication from the initiating unit, the target unit, switches to transmit at the selected rate, and sends a response or acknowledgement to the initiating unit.

9) If the high rate has been selected, and for some reason signal propagation conditions change during the communications session such that communication at the high rate becomes impossible, the units would after a timeout period attempt to reestablish the session at the standard data rate.

It will be apparent that many further modifications and variations may be effected without departing from the scope of the teachings and concepts of the present invention.

Description of FIGS. 13-16

In the protocol of FIG. 5, the base station and mobile terminals were only capable of single data rate operation at a limited normal data rate. Such a limited normal data rate was selected so that reliable communication could take place over the entire geographical operating range of the mobile transceiver units. Such a normal data rate is selected taking account that the mobile transceiver units may operate not only at close range where received signals are strong, but also in fringe areas where received signals are extremely weak. Furthermore, the mobile units may operate under extreme conditions of temperature in comparison with the temperature of the base transceiver station.

FIGS. 13 to 16 illustrate enhanced protocol systems suitable for upgrading a system such as illustrated in FIG. 5 for increased data throughput without requiring the upgrading of firmware in the large population of terminals designed for single data rate operation at the normal data rate. The approach of FIGS. 13 to 16 achieves an advantageous simplicity in operation of the data collection system in spite of the presence of such single data rate mobile terminal units.

In the embodiments of FIGS. 13 to 16, the base/controller station dynamically adjusts the number of slots associated with a low data rate poll based upon channel traffic at the low data rate, and dynamically adjusts the number of slots associated with a higher data rate poll based on channel traffic at the higher data rate. A terminal capable of high data rate operation for which the base station has an (outbound) message may be initially identified as part of a multi-terminal poll (MTP) having the high data rate if such high rate was currently being used by such terminal. However, because of the possible rapid variation in operating conditions for each terminal during its movement at varying distances from the base transceiver station, if the base does not receive a response from such a terminal at the high data rate, the base may send the address of such a station as part of further multi-terminal polls at the normal data rate as well as at the high data rate. A terminal having multiple data rate capabilities, with a need to transmit an inbound message, will monitor the higher data rate poll and if such higher data rate poll is successfully received, the received signal will be evaluated e.g. taking account of received signal strength and potential rapid signal fading effects, so as to determine whether transmission should be attempted at the high data rate.

As explained in relation to FIG. 12, the contention polling signal at the higher data rate may have its received signal strength measured at 270, FIG. 12, the RSSI output being sampled several times during receipt, and evaluated according to a weighted average value, the weighting function giving emphasis to the lower signal strengths measured, since the average strength of a fading signal tends to approximate its peak value. The indicator 271 may be utilized to measure jitter due to noise and distortion in the radio link as described with reference to FIG. 12. Further, temperature measurements at the base transceiver unit and at the mobile terminal unit may be compared utilizing temperature sensors such as 73A and 83A as described in reference to FIG. 6.

Figure 13:
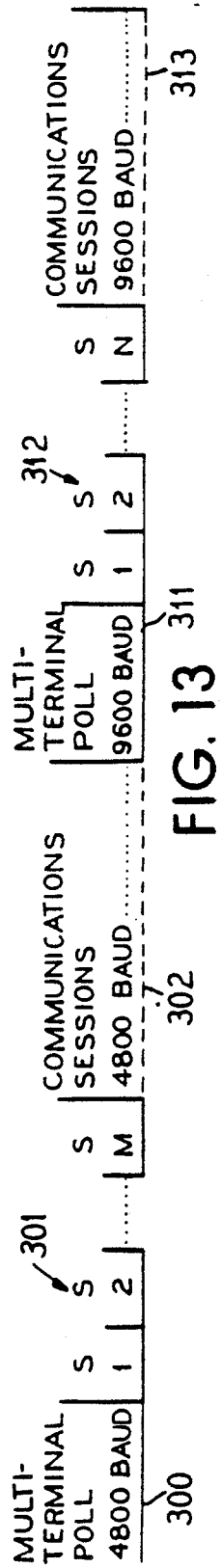
FIGS 13-16 are diagrams illustrating preferred modes of operating a system utilizing both a limited normal data rate (e.g. 4800 baud) and a higher data rate (e.g. 9600 baud), FIG. 13 showing a general case of M low data rate response slots and of N high data rate response slots, N and M being independently controlled for optimum throughput.

At the conclusion of contention polling at the low date rate, the base station establishes communications sessions with those mobile units that were successfully identified within the allocated number of response slots associated with such low data rate poll. Such communications sessions are established by polling the respective terminal by means of its unique address, receiving the terminal response, and the base transmitting an acknowledgement for each respective terminal. The combination of the multi-terminal contention poll and resulting communication sessions comprises one variable length low data rate communications frame. Such a variable length communications frame is represented in FIG. 13 as comprising a low data rate (e.g. 4800 baud) multi-terminal poll during interval 300, followed by a selected number of response slots S1, S2, . . . , SM. The response time interval 301 represented by the total duration of the M slots is then indicated as being followed by a low data rate (e.g. 4800 baud) communications session during an interval 302.

In FIG. 13, the variable length low data rate communications frame 300-302, is followed by a high data rate variable length communications frame including a high data rate (e.g. 9600 baud) multi-terminal poll at 311, a selected number of response slots S1, S2, . . . , SN (where N would generally be a different number than M), covering a response time interval 312, and followed by a high data rate communications session with successfully responding mobile terminal units as indicated at 313.

Figure 14:
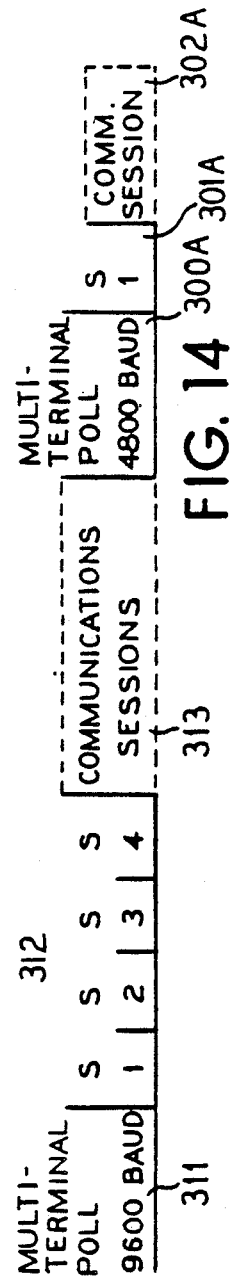

FIG. 14 illustrates a specific example in accordance with FIG. 13 where the low data rate and high data rate communications frames alternate, FIG. 14 showing four response slots following a high data rate multi-terminal poll interval 311 (N equals four), and one response slot following the low data rate multi-terminal poll at interval 300.

In the embodiments of FIGS. 13 and 14, the base/controller station transmits multi-terminal polls alternately at the low and high data rates, and the individual mobile terminal units will selectively respond to the contention poll which provides the optimum data rate for the channel characteristics in their respective current locations. Such response will establish the data rate for the subsequent communication session between the base and a successfully responding mobile terminal unit.

The data rate determination can conceivably be made using any or all of the means described with reference to FIGS. 6 through 12. A simple approach is to (a) require the mobile terminal units to successfully decode the high data rate poll and (b) require the RSSI output to indicate a received signal level providing sufficient fade margin (e.g. twenty decibels higher than the high data rate sensitivity threshold of the terminal base) in order to use the high rate. The high data rate sensitivity threshold is taken with reference to the maximum acceptable bit error rate (BER) for the given application (e.g. a nominal $10^{-6}$, i.e. ten to the minus six power, or one in one million, BER sensitivity at the high data rate), the RSSI threshold being selected so as to result in some small number of re-transmissions due to fading effects and other channel disturbances. As previously explained, the RSSI measurement is to be weighted so as to take account of the rapid fading effects which can be expected when the mobile transceiver units are in continuous or frequent motion at various distances from the base transceiver station. Such rapid fading effects are to be contrasted with slow fading effects which might be experienced between stationary transceivers in an office building due to the movement of people, mail carts, and the like. In a typical application of the present invention, the RF transceiver of a mobile unit may be secured with a bar code scanner such as a deflected laser beam bar code scanner or an instant type CCD bar code scanner. In such an example, the bar code data could be transmitted to the base station as the RF transceiver and a scanner device were being jointly transported by a vehicle (e.g. a forklift truck) to another site, or the RF transceiver and a scanner e.g. as a unitary hand-held device, could be carried by the operator to another site as the bar code data was being transmitted to the base station. Because of the possible continuous or frequent movement of the mobile transceiver units within a factory or warehouse environment or in outdoor environments, the successful reception of a high data rate polling signal alone generally should not be relied upon in evaluating whether communication should be carried out at the high data rate. The probable feasibility of communication at the high data rate, (with the goal of higher data throughput in the system), must also take account of the possible motion of the mobile transceiver unit and the consequent possibility of fast fading (rapid fluctuations in signal level due to multipath effects) during the course of a message transmission (e.g. of collected bar code data). Thus, the purpose of using a signal quality indication, for example the RSSI measurement of component 270, FIG. 12, or the jitter characterization as represented at 271, FIG. 12, is to ascertain whether there is likely to be sufficient margin against fading (or other channel disturbance such as impulsive noise due to electrical machinery) during the course of the transmission.

By way of example, empirical data sows that twenty decibels of signal margin relative to the nominal $10^{-6}$ (ten to the minus six power, or one in one million) BER sensitivity threshold at the high data rate, provides protection against about ninety percent of the fades encountered in fringe areas in a typical industrial environment, while fifteen decibels of signal margin provides protection against seventy percent of such fades. Thus, for example, the RSSI threshold for determining whether to transmit at the high or low rate is established at some level above the minimum level at which reliable communication is usually possible at the higher data rate. If the threshold is set too high, a significant number of transmissions which could have been made at the high rate will be made at the low rate, reducing throughput. If the threshold is set too low, fading will result in a significant number of re-transmissions, which will also reduce throughput. An optimum RSSI threshold at twenty decibels above the nominal $10^{-6}$ BER sensitivity at the high data rate will result in some small number of re-transmissions due to channel disturbances, but generally will provide an optimum data throughput for the overall system.

In the generalized case, the unit completing the handshake transmission (e.g. the unit making the response to a multi-terminal contention poll) makes the rate switching decision. In the embodiment of FIGS. 13 and 14, the rate switching decision is to be made by the mobile terminal unit. A decision in both the base station and the mobile transceiver unit might be desirable if the channel were not symmetric, for example if the base station had significantly higher power output than the mobile unit. The approach of having the mobile transceiver units equipped with sufficient intelligence to distribute to them the data rate switching rate decision, results in fewer transmissions required to dynamically adapt data rate in a rapidly changing propagation environment. The system as represented in FIGS. 13 and 14 in this respect is particularly adapted to the data collection environment wherein the mobile transceiver units may be in continuous or frequent motion with consequent rapid variations in signal strength, frequent operation in fringe conditions, and environmental extremes (e.g. of temperature as between a mobile unit and base station) degrading hardware performance.

In the simple example where data rate determination is based on the successful decoding of the high data rate poll and an adequate RSSI output evaluated to take account of rapid signal fading effects, the poll at 311 itself actually functions as a test pattern, and the occurrence of any bit errors in the decoding of the high data poll indicates the use of the low rate. The system of FIGS. 13 and 14 may make use of jitter characterization, e.g. based on the stability of recovered data clock during the received polling signal itself. As a fail-safe measure, excessive failures at accessing the base station through response to the multi-terminal poll, or errant message transmission attempts at the high data rate will result in the mobile terminals selecting the low data rate, with periodic retries at the higher rate, e.g. based on the various criteria described with respect FIGS. 6 through 12.

Internal temperature information can be used in conjunction with a stored table containing typical oscillator frequency offsets as a function of temperature. The combination use of the fail-safe mode (good signal strength, but poor communications), and operation at a temperature where large oscillator frequency offsets can typically be expected, will dictate less frequent retry attempts until temperature measurements indicate that the frequency offset is most likely reduced.

The ability of the base station according to FIGS. 13 and 14 to independently adjust the number of slots for the low data rate frames and for the high data rate frames according to the recent traffic at the respective data rate, preserves the throughput advantage of dual or multiple data rate operation by minimizing system overhead.

The example of FIG. 14 where four slots are allocated to high data rate communications (e.g. 9600 baud), and one slot is allocated to low data rate communications (e.g. 4800 baud) may result where the majority of traffic had been occurring at the higher data rate, with perhaps only occasional transmissions at the lower rate.

Figure 15:
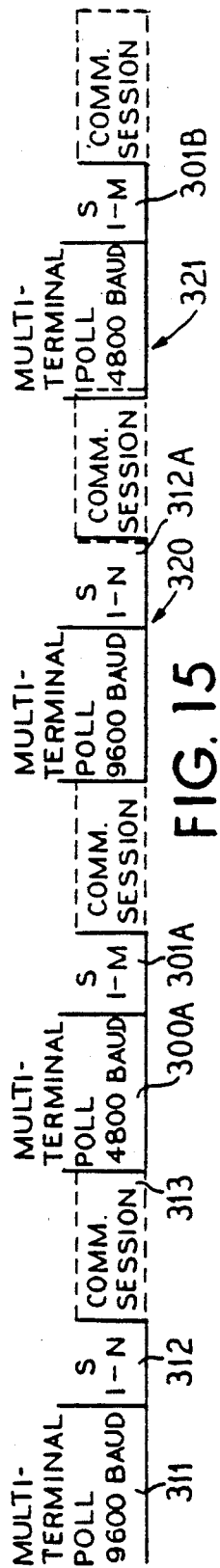

FIG. 15 shows switching alternately between the high and low data rate frames, with the values of N and M varying in accordance with the numbers of responses to the respective high data rate and low data rate polls. For example, if a number of full slots and collisions between responding mobile stations occurs with a value of N of four as in FIG. 14, a succeeding high data rate frame such as indicated at 320 in FIG. 15 may take place with an increased number of slots, e.g. five slots (N equals five) or more at 312-A, FIG. 15. Similarly if collisions occurred at the single slot at interval 301A in response to the low data rate poll, then the number of slots at a subsequent communications frame 321 might be increased to two (M equals two) or more during the response interval 301B, FIG. 15.

Figure 16:
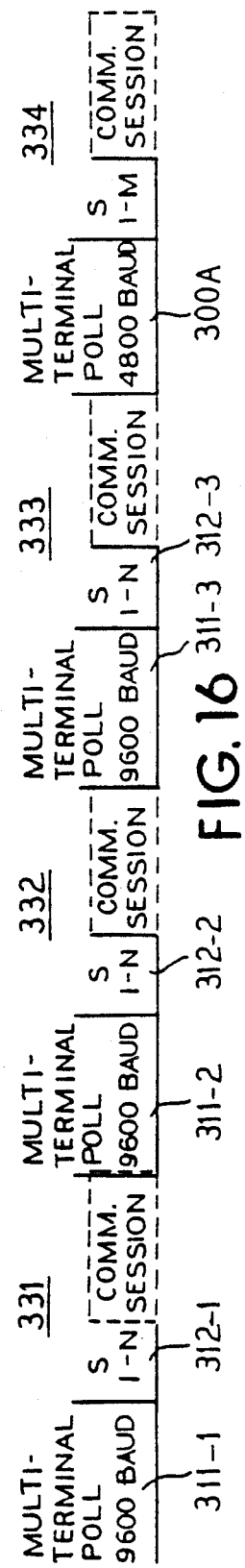

FIG. 16 shows a different switching implementation which more heavily favors one rate (in this case a high data rate of 9600 baud) or the other. This could be the case when no active terminals are communicating at one of the two rates, and only periodic transmissions at the unused rate are necessary to provide access for terminals which might have been out of range of the base or powered off. Thus in FIG. 16, three successive high data rate communications frames 331, 332, 333, alternate with a single low data rate communication frame 334. As before, the successive multi-terminal contention polls may be at a data rate of 9600 baud as indicated at 311-1, 311-2 and 311-3, and the number of response slots at 312-1, 312-2 and 312-3 may be varied in successive frames and in successive cycles of high data rate and low data frames to dynamically adapt the system to the instantaneous loading conditions at the respective data rates.

Figure 17:
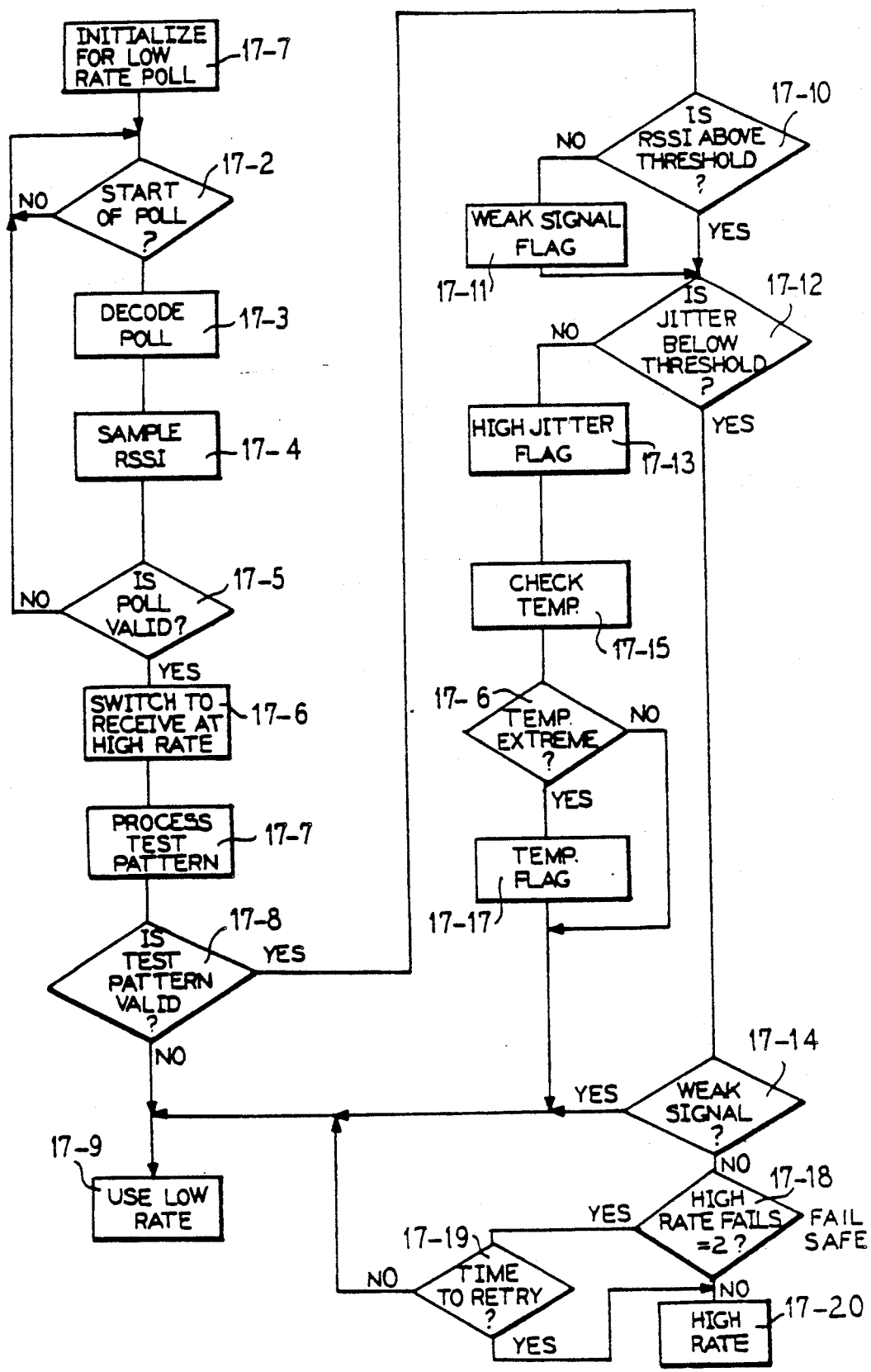
FIG. 17 is a flow diagram giving exemplary steps which are particularly applicable to the embodiment of FIG. 11, but which are also generally applicable with modifications to various of the other embodiments.

Description of FIG. 17

For each of the preceding embodiments, operation may be carried out at the mobile transceiver units generally as represented in FIG. 17. In this sequence of operation, the base station issues a poll at the lower data rate which is followed by a test pattern at the higher data rate. For FIGS. 13-16, the high data rate contention poll at 311 or 311-1 constitutes the test signal.

The mobile transceiver units initialize for reception of the low data rate poll as indicated at 17-1 and wait for the start of the poll as indicated at 17-2. When the poll is received, it is decoded as indicated at 17-3 and the RSSI reading is sampled as indicated in 17-4. If the evaluation of the poll as indicated at 17-5 is favorable, the mobile unit switches to receive a test pattern at the high data rate as indicated at 17-6 and processes the high data rate test pattern as indicated at 17-7.

Referring to the embodiment of FIGS. 13-16, each time the multiple rate mobile units are reset by the base, the mobile transceivers may be placed in low date rate receiving condition, whereupon the base station sends a low data rate poll e.g. at 300, FIG. 13. When a valid low data rate poll with characteristics (e.g. sampled and properly weighted signal strength) favorable to the use of the high data rate for the transmission of collected data, has been received by a given multiple rate mobile unit, the transceiver of such mobile unit is switched to receive a high rate contention poll signal as at 311, FIGS. 13, 14 and 15, or as at 311-1, FIG. 16. The steps following step 17-7 in FIG. 17 would then involve evaluation of such high data rate contention poll for validity and evaluation of the characteristics of the received high data rate contention poll (e.g. with respect to received signal strength and/or jitter as described with reference to FIGS. 13-16).

If the decision concerning the test pattern (e.g. as represented at 210, FIG. 11) or concerning the high data rate contention poll of FIGS. 13-16, as represented by block 17-8 in FIG. 17, is negative, then the mobile transceiver unit may respond selecting the low data rate for transmission of its data (as with mobile unit #0 in FIG. 11) or the mobile transceiver unit may await a low data rate poll (as at 300A, FIGS. 14, 15 and 16).

Where a mobile unit selects a low date rate and successfully responds, a specific poll addressed to the mobile unit will then be at the low data rate as represented by "poll #0" in FIG. 11, and the data then transmitted to the base will be sent at the low data rate as shown in FIG. 11, and as represented by block 17-9, FIG. 17.

If the decision at 17-8 favors the high data rate, then the weighted evaluation of the RSSI samples may take place as indicated at 17-10, a flag being set as indicated at 17-11 where the evaluation indicates marginal transmission conditions.

At 17-12, jitter is evaluated and for the case of excessive jitter, a high jitter flag is set as indicated at 17-13. Where jitter is acceptable, but the weak signal flag is set, the decision at 17-14 leads to use of the low data rate as indicated at 17-9.

For the case of high jitter at 17-13, the temperature values are checked as indicated at 17-15 and a temperature decision is made at 17-16. For example, if the mobile unit is at an extreme temperature this may result in a setting of a temperature flag as indicated at 17-17. On the other hand, the base station may transmit its temperature condition to the mobile units so that the mobile units can determine the actual temperature differential between the respective mobile unit and the base station and set the flag at 17-17 accordingly. In any event, the high jitter condition results in a return to the low data rate as indicated at 17-9.

Where jitter is below a threshold and signal strength is adequate, the mobile unit may evaluate whether there has been a high rate of failures, and for example if there have been a given number of such failures (e.g. two or e.g. two out of three attempts), then control may pass to a decision block 17-19 which may normally determine for the low rate unless under the present circumstances of temperature or elapsed time or the like it is determined that it is time to retry at the high rate. The decision block 17-18 together with the block 17-19 then safe guards against a circumstance where the mobile unit might otherwise continue to try the high data rate in spite of repeated failures. The retry criteria may be as previously described with respect to FIGS. 6 through 12. If the decision is to attempt response at the high rate as indicated at 17-20, the mobile unit may respond in a randomly selected time slot with a response (e.g. at the low data rate) signifying that further communication is to take place during individual polling of the identified mobile unit at the high data rate for example as represented with respect to mobile unit number two in FIG. 11.

For the embodiments of FIGS. 13-16, where the high data rate contention poll (e.g. at 311) is treated as a high data rate test signal for processing as at 17-7 in FIG. 17, the decision process at 17-8 et seq. in FIG. 17 may proceed concurrently with the random selection of a response slot and switching to high data rate transmit mode, so that if the mobile unit is to respond to the high data rate contention poll, such response can take place at any of slots S1, S2, S3, or S4, for example, during interval 312, FIG. 14. Of course, for the case where the switching to the high data transmit mode is only made at 17-20, the interval between the contention poll and the first response slot will provide for maximum processing time and the required switching time.

With respect to decision block 17-19, as a simple example, in the fail-safe condition, the mobile unit might continue to respond at the lower rate for some number of polls (such as five) before attempting to try the high rate response procedure at 17-20.

The flags for different failure mechanisms are only included in the example of FIG. 17 so that some history can be maintained for use in making retry decisions (if a more complex retry algorithm is desired). The flags can be omitted in which case the "No" output of the RSSI threshold decision 17-10 can go directly to the low rate block 17-9 and the decision block 17-14 and the temperature processing blocks 17-15, 17-16 and 17-17 can be omitted since they are superfluous if jitter is acceptable. The "No" output of block 17-12 would lead to low data rate block 17-9 where the flags are omitted.

Many modifications and variations will be apparent from the foregoing disclosure. For example, the base station could have provision for parallel baseband processing of received and demodulated signals, e.g. the demodulated signal being supplied in parallel to a 4800 baud analog processor and to a 9600 baud analog processor. The baseband digital processing section would include a 4800 baud receive buffer and a 9600 baud receive buffer so that the base station could receive either a 4800 baud or a 9600 baud signal whenever the base station was in receive mode. Then for the embodiment of FIGS. 11 and 17, for example, the various mobile units with data messages to send could all send the same type of response signal (i.e. their respective addresses but without specifying a data rate selection) in randomly selected time slots pursuant to an affirmative decision at 17-5. The further steps of FIG. 17 would then determine whether to respond to a specific poll addressed to the respective mobile unit, using a high data rate or a low data rate for the transmission e g. of collected scanner data. Such specifically addressed polls of individual mobile units could all be sent by the base station at the low data rate. If a given mobile unit sent its data message at the high data rate, the base high data rate receive buffer would automatically receive the data and transfer it for processing. The base station would not need to be informed in advance of the date rate decision made by the mobile unit e.g. pursuant to FIG. 17.

Many other and further modifications and variations may be made without departing from the broader teachings and concepts of the present invention.

Supplemental Discussion

For a protocol such as shown in FIG. 5, a contention polling message is transmitted having a fifteen millisecond header, a start of message block, a code identifying the message as a multi-terminal poll, a block specifying the number of time slots which may be selected for response, a block identifying the addresses of mobile units for which the base station has a message, a cyclic redundancy check character, and an end of message character. The same format may be used for a high data rate contention poll, the header then containing seventy-five bits at a data rate of 9600 baud (instead of 37.5 bits at 4800 baud).

In a base initiated reset, the base station would transmit a low data rate reset message and would allocate a large number of response slots to allow responses by all mobile units. The base station could send a low data rate contention poll with a large number of response slots several times in succession, and the mobile units could randomly determine which contention poll to respond to, as well as randomly determining which of the large number of time slots to respond in.

If for example, after a base initiated reset, a multiple data rate mobile unit had scanner data to transmit, such mobile unit could await a test signal, e.g. as at 311, FIGS. 13, 14, or 15, or 311-1, FIG. 16. If a determination was made that high data rate transmission of the collected data should be attempted, the mobile unit could proceed as herein described for the respective embodiments of FIGS. 13-16. Once having selected high data rate operation, a mobile unit could continue to monitor high data rate contention polls for the examples of FIGS. 13-16. Thus if the base station dynamically varied the proportion of high data rate and low data rate polls as in the embodiment of FIG. 16, it would not be necessary to advise the mobile units of the changes in the pattern. The mobile units could be programmed to switch to low data rate operation whenever a failure of communication occurred at the high date rate, but otherwise to remain in high data rate mode e.g. for a suitable time e.g. five seconds. By switching to low data rate mode after five seconds, the mobile unit would be assured of being notified of a pending message from the base station even if the base station was supplying high data rate contention polls very infrequently or not at all because of very light high data rate traffic. A mobile unit could be programmed to send its data message at the low data rate, e.g. if it waited for a specified time such as five seconds, and failed to receive a high data rate contention poll within such specified time interval.

Example of Dynamic Selection of Number of Response Slots

For the case of contention polling as in the various embodiments including FIG. 5 herein, the base station may dynamically vary the number of response time slots (such as 41-44, FIG. 5) according to traffic at a fixed data rate, or may dynamically vary the respective numbers of slots associated with respective different data rate contention polls (e.g. as in FIGS. 13-16).

For each data rate, a number of response slots for each contention poll may be set in order to force the ratio between the number of empty response slots (wherein no mobile unit responses are received) and all other slots (ones with successful responses or collisions) to tend toward eighty percent (80%).

If the ratio computed for twenty successive slots is between sixty percent (60%) and seventy percent (70%), then the base controller would add one additional slot (e.g. a fifth slot in FIG. 5) for the next transmission of the contention poll.

If the ratio computed for ten successive slots is less than sixty percent (60%), then the controller would add two additional slots (e.g. fifth and sixth slots in FIG. 5) so that the next contention poll from the base would specify the previous number of slots increased by two (e.g. six slots in FIG. 5).

If the ratio compound for thirty successive slots was over ninety percent (90%), the base controller would reduce the number of slots by one (e.g. to three in FIG. 5).

Finally, if no empty slots were observed over seven successive slots (ratio equals zero), the base controller could switch to a serial poll protocol where each mobile unit is polled in sequence, or for the example of FIG. 16, if feasible, change the proportion of low data rate and high date rate polling communications frames.

The foregoing example demonstrates several advantages of dynamic adaptive control of number of response slots, or more generally of response time intervals following a contention poll. First, when little traffic is present, few response Slots are allocated. This reduces to a minimum the amount of system overhead required and therefore the response time is kept to a minimum for mobile terminals needing the channel. Second, the rate at which slots are added and removed can be tailored to handle bursty traffic loading without causing the system to overload. Third, the protocol can be changed, if required, to support high system loading.

Incorporation by Reference

Reference is made pursuant to 35 USC 120 to the following pending patent applications: Marvin L. Sojka application U.S. Ser. No. 07/265,842 filed Nov. 1, 1988, and Marvin L. Sojka application U.S. Ser. No. 07/292,810 filed Jan. 3, 1989, and each of these pending patent applications is hereby incorporated herein by reference in its entirety including Appendices and drawings.

What is claimed is:

1. The method of operating a radio frequency data communication system wherein a multiplicity of mobile transceiver units are to collect data and are to be able to transmit the collected data promptly after its collection to a base transceiver station, during movement of the mobile transceiver units at varying distances from the base transceiver station and wherein reliable communication with such mobile transceiver units over the area of movement of the mobile transceiver units could only take place at a limited normal data rate, said method comprising:
    effecting transmission of a test signal from the base transceiver station to the mobile transceiver units,
    at respective mobile transceiver units, evaluating characteristics of the test signal which are predictive of successful communication of the respective mobile transceiver unit with the base transceiver station at a higher than normal data rate in spite of potential adverse transmission conditions,
    for less favorably situated mobile transceiver units which have collected data to send and which do not successfully receive the test signal or which do successfully receive the test signal but determine that the transmission at a high data rate would be likely to be subject to detrimental transmission conditions, arranging to send the collected data to the base transceiver station at a limited normal data rate, and
    for more favorably situated mobile transceiver units which have collected data to send and which successfully receive the test signal and which determine that transmission conditions are not likely to prevent successful transmission at a high data rate, arranging to send the collected data at a high data rate substantially higher than the normal data rate.

2. The method of claim 1, wherein the test signal is part of a communications frame, and wherein at least one of the more favorably situated mobile transceiver units sends its collected data at the high data rate within the same communications frame as the test signal so as to minimize the time between the test signal and a high data rate transmission prompted thereby.

3. The method of claim 1, wherein the test signal is a high data rate contention polling signal.

4. The method of claim 1, wherein the test signal is a limited normal data rate contention polling signal.

5. The method of claim 1, wherein the test signal is a special test pattern comprising a known bit sequence.

6. The method of claim 1, wherein the test signal is comprised of a known bit sequence having a length of at least about forty bits.

7. The method of claim 1, wherein scanners are associated with respective mobile transceiver units and supply data to the respective transceiver units based on manual transport of the transceiver units and scanners to successive locations of scanner readable data, the scanned data from one location being transmitted to the base transceiver unit during manual transport of the transceiver unit and scanner to the next location.

8. The method of claim 1, wherein the mobile transceiver units which are able to receive said test signal evaluate the received signal strength taking account on rapid signal fading effects in determining whether transmission should be attempted at a high data rate.

9. The method of claim 8, wherein the received signal strength is sampled several times during receipt of the test signal and is evaluated based upon a weighted average value giving emphasis to received signals which are of lower strengths.

10. The method of claim 8, wherein a mobile transceiver unit which is able to receive the test signal responds at a high data rate when the received signal strength evaluation shows a sufficient fade margin, preferably twenty decibels higher than the high data rate sensitivity threshold.

11. The method of operating a radio frequency data communication system wherein a multiplicity of mobile transceiver units are to collect data and are to be able to transmit the collected data promptly after its collection to a base transceiver station, during movement of the mobile transceiver units at varying distances from the base transceiver station and wherein reliable communication with such mobile transceiver units over the area of movement of the mobile transceiver units could only take place at a limited normal data rate, said method comprising:
    effecting RF wireless transmission of a first signal from the base transceiver station to the mobile transceiver units at an increased data rate substantially higher than the normal data rate,
    at respective mobile transceiver units which successfully receive said first signal, evaluating characteristics of the first signal which are predictive of successful communication of the respective mobile transceiver unit with the base transceiver station at a higher than normal data rate in spite of potential adverse transmission conditions,
    effecting RF wireless transmission of a second signal from the base transceiver station to the mobile transceiver units at a limited normal data rate, for less favorably situated mobile transceiver units which have collected data to send and which do not successfully receive the first signal or which do successfully receive the first signal but determine that transmission at a high data rate would be likely to be subject to detrimental transmission conditions, arranging to send the collected data to the base transceiver station at a limited normal data rate, and for more favorably situated mobile transceiver units which have collected data to send and which successfully receive the first signal and which determine that transmission conditions are not likely to prevent successful transmission at a high data rate, arranging to send the collected data at a high data rate substantially higher than the normal data rate.

12. The method of claim 11, wherein the first and second signals are contention polling signals, the less favorably situated mobile transceiver units transmitting their identities to the base transceiver station in response to the second polling signal, and the more favorably situated mobile transceiver units transmitting their identities to the base transceiver station in response to the first polling signal.

13. The method of claim 11, wherein the base transceiver station dynamically allocates respective first and second times following the first and second signals in which mobile transceiver units may respond, in accordance with the mobile transceiver units which have responded to previously transmitted such first signal and in accordance with the mobile transceiver units which have responded to previously transmitted such second signal.

14. The method of claim 13, wherein the base transceiver station effects RF wireless transmission of information as to its dynamic selection of the first and second times as part of the first and second signals, respectively, the mobile transceiver units transmitting their respective identities at respective essentially randomly selected intervals within the respective first and second times as obtained from the respective received first and second signals.

15. The method of claim 13, wherein the base transceiver station dynamically allocates respective numbers of first and second time slots following the first and second signals, respectively, within which the mobile transceiver units may respond, the base transceiver station selecting the current values of the respective numbers of such first and second time slots according to the respective numbers of mobile transceiver units which have responded to previously transmitted such first and second signals, and the currently more favorably and less favorably situated mobile transceiver units responding to the first and second signals at randomly selected ones of the currently allocated first and second time slots, respectively.

16. The method of claim 15, wherein the base transceiver station takes account of the number of instances when there are no responses in a time slot, when all of the time slots following the first or second signal have responses, or when more than one mobile transceiver unit seeks to respond in the same time slot resulting in collision and increases or decreases the allocated numbers of first and second time slots accordingly.

17. The method of claim 11, wherein the base transceiver station sends the first signal, and grants communication time to successfully responding currently more favorably situated mobile transceiver units in turn, and then sends the second signal, and grants communication time to successfully responding currently less favorably situated mobile transceiver units.

18. The method of claim 11, wherein the base transceiver station effects transmission of one of the first or second signals a number of times in succession before sending the other of the first and second signals, so as to accommodate larger or smaller numbers of currently less favorably and more favorably situated mobile transceiver units.

19. The method of claim 11, wherein the base transceiver station includes with said first and second signals information identifying any mobile transceiver units for which it has a message.

20. The method of claim 19, wherein the base transceiver station maintains a list of mobile transceiver units which have successfully responded to a recently transmitted first signal, and includes the identity of any of the currently listed mobile transceiver units for which it has a message in conjunction with the transmission of a further first signal, while also including the identity of currently listed mobile transceiver units with the transmission of a second signal so as to insure that the message is delivered in spite of changing transmission conditions 21. The method of claim 11, wherein the mobile transceiver units which are able to receive said first signal evaluate the received signal strength taking account of rapid signal fading effects in determining whether transmission should be attempted at a high data rate.

22. The method of claim 21, wherein the received signal strength is sampled several times during receipt of the first signal and is evaluated based upon a weighted average value giving emphasis to the lower signal strengths.

23. The method of claim 21, wherein a mobile transceiver unit which is able to receive the first signal responds at a high data rate when the received signal strength evaluation shows a sufficient fade margin of about twenty decibels higher than the high data rate sensitivity threshold.

24. The method of claim 11, wherein the first signal includes a test pattern.

25. The method of claim 24, wherein the test pattern is comprised of a known bit sequence.

26. The method of claim 24, wherein the test pattern is comprised of a known bit sequence having a length of at least about forty bits.

27. The method of claim 24, wherein the jitter characteristics of the received test pattern are used to predict whether successful communication at the higher data rate is probable.

28. The method of claim 11, wherein the first signal is evaluated as to received signal strength so as to predict the feasibility of communication between a mobile transceiver unit and the base transceiver station at the higher data rate.

29. The method of claim 11, wherein characteristics of the first signal as received are evaluated along with a temperature measurement to determine whether a mobile transceiver unit for which the evaluation of received signal is favorable to a high data rate, but which has previously failed as to high data rate communication should again attempt transmission at a high data rate.

30. The method of operating a radio frequency data communication system wherein a multiplicity of mobile transceiver units are to collect data and are to be able to transmit the collected data promptly after its collection to a base transceiver station, during movement of the mobile transceiver units at varying distances from the base transceiver station and wherein reliable communication with such mobile transceiver units over the entire area of mobile operation could only take place at a limited normal data rate, said method comprising:

in a communications interchange between the base transceiver station and one or more mobile transceiver units, effecting with a RF wireless transmission, the transmission of a test signal in one communication direction via an RF link, at a receiver receiving the test signal, evaluating the characteristics of the test signal which are predictive of successful communication between a respective mobile transceiver unit and the base transceiver station at a higher than normal data rate in spite of potential adverse transmission conditions, if the evaluation of the received test signal determines that transmission at a high data rate would be likely to be subject to detrimental transmission conditions, transmitting a responsive RF wireless transmission in the opposite communication direction via said RF link signalling for further communications interchange at the limited normal data rate, and if the evaluation of the received test signal determines that transmission conditions are not likely to prevent successful transmission at a high data rate, transmitting a responsive RF wireless transmission in such opposite communication direction via said RF link signalling for further communications interchange at a higher data rate substantially higher than the limited normal data rate.

31. The method of claim 30, wherein the test signal is transmitted by a mobile transceiver unit in response to a polling signal from the base transceiver station.

32. The method of claim 30, wherein the test signal is associated with a polling signal transmitted by the base transceiver station.

33. The method of claim 32, wherein the test signal is associated with a contention polling signal defining a time interval for random response by the mobile transceiver units.

34. In a radio frequency data communication system, base station transceiver means selectively operable for data communication at a lower relatively conservative first data rate where reliable transmission is obtained under a relatively wide range of operating conditions, and at a relatively less conservative second data rate which is substantially higher than said first data rate and provides reliable data communication under a more restricted range of operating conditions, a plurality of mobile transceiver units in radio communication with said base station transceiver means and selectively operable for data communication at said first data rate and at said second data rate, control means evaluating a test transmission occurring between the base station transceiver means and at least one of said plurality of mobile transceiver units, and operable to evaluate said test transmission as received to determine the probable feasibility of data communication between said base station and said one of said plurality of mobile transceiver units at said relatively less conservative second data rate and selecting according to such evaluation said second data rate if evaluated as probably feasible and otherwise said lower relatively conservative first data rate, and data rate switchover means controlled by said control means for automatically effecting data communication at the first and second data rates according to the evaluation by said control means of the test transmission.

35. In a radio frequency data communication system according to claim 34, said mobile transceiver units being assigned polling addresses, and said control means controlling said base station transceiver means to send polling messages at said first data rate to respective individual mobile transceiver units which are assigned respective polling addresses, and said control means controlling said base station transceiver means to send a test transmission at said second data rate which is interlaced with polling messages transmitted at said first data rate.

36. In a radio frequency data communication system according to claim 34, said control means controlling said base station transceiver means to send a general polling message at the first data rate and then to await responses from at least certain of said mobile transceiver units in at least one response interval, said control means controlling said base station transceiver means to send a test transmission, time offset from the general polling message and the at least one response interval, at the second data rate, said mobile transceiver units being responsive to the test transmission at said second data rate to send a first signal at said first data rate when the test pattern transmission is inaccurately received, and to send a second signal at said first data rate when the test pattern transmission is accurately received, and said control means being responsive to a first signal from a mobile transceiver unit signifying inaccurate reception of such test pattern to control said base station transceiver means to receive a data transmission at said first data rate, and being responsive to a second signal from a mobile transceiver unit to control said base station transceiver means to receive a data transmission at said second data rate.

37. In a radio frequency data communication system according to claim 34, said control means comprising received signal strength indicator means for evaluating the received signal strength of said test transmission.

38. In a radio frequency data communication system according to claim 34, said control means comprising means for evaluating jitter in the received test transmission.

39. In a radio frequency data communication system according to claim 34, said control means comprising signal quality indicator means receiving a test transmission comprised of a known bit pattern having a length of at least about forty bits and evaluating the quality of the communications channel transmitting the test transmission according to the number of errors detected in the transmission of the known bit pattern.

40. In a radio frequency data communication system wherein a multiplicity of mobile transceiver units are to collect data and are to transmit the collected data promptly after its collection to a base transceiver station and wherein reliable communication between such mobile transceiver units and said base transceiver station could occur at a limited data rate, the invention comprising a base transceiver station capable of transmitting data at a limited data rate and at an increased data rate, said base transceiver station selectively transmitting a first signal to the mobile transceiver units at the increased data rate, the mobile transceiver units evaluating the first signal from the base transceiver station to predict whether successful communication with the base transceiver station will occur at the increased data rate, said mobile transceiver units which predict successful communication with the base transceiver station at the increased data rate responding to said first signal at the increased data rate, said mobile transceiver units which fail to predict successful communication with the base transceiver station at the increased rate responding to said first signal at the limited data rate.

41. The invention of claim 40 wherein said first signal of said base transceiver station is part of a communication frame, said mobile transceiver units which respond at the increased data rate transmitting collected data to said base transceiver station within said communications frame.

42. The invention of claim 40 wherein said first signal is a contention polling signal.

43. The invention of claim 40 wherein said first signal is a test pattern comprising a known bit sequence.

44. The invention of claim 40 wherein optical scanning devices are operably associated with said mobile transceiver units for collection of data, said data being communicated to said base transceiver station while said mobile transceiver units are mobile.

45. The invention of claim 40 wherein said base transceiver station evaluates said responses of said mobile transceiver units responding at the increased data rate and dynamically allocates time slots for communication with said increased data rate responding mobile transceiver units.

46. The invention of claim 45 wherein said base transceiver station evaluates said responses of said mobile transceiver units responding at the limited data rate and dynamically allocates time slots for communication with said limited data rate responding mobile transceiver units.

47. The invention of claim 40 wherein said mobile transceiver units responding at the increased data rate transmitting their identities to said base transceiver station and said mobile transceiver units responding at the limited data rate transmitting their identities to said base transceiver station.

48. The invention of claim 46 wherein said base transceiver station dynamically adjusts the time slots for said increased rate responding mobile transceiver units and for said limited rate responding mobile transceiver units upon one or more of said increased rate responding mobile transceiver units responding at substantially the same time as other increased rate responding mobile transceiver units.

49. A radio frequency data communication system for transmission of data collected by a multiplicity of mobile transceiver units, to a base transceiver, comprising:

a base transceiver selectively operable at a limited data rate and at an increased data rate the multiplicity of mobile transceiver units selectively operable at the limited data rate and at the increased data rate, said mobile transceiver units responsive to transmission by said base transceiver, and having control means therein to evaluate the feasibility of responding at said increased data rate, said base transceiver capable of determining which mobile transceiver units respond to the transmission of a polling signal transmitted at said increased data rate and allocating time slots for transmission to said mobile units which responded at the increased data rate, said base transceiver communicative at said increased data rate during said allocated time slots with said mobile transceiver units which respond at said increased data rate.

* * * * *